(12) United States Patent
Hauk

(10) Patent No.: US 10,269,059 B2
(45) Date of Patent: Apr. 23, 2019

(54) COMPUTERIZED EXCHANGE NETWORK

(71) Applicant: Sharp Cars Detailing & More, LLC, O'Fallon, MO (US)

(72) Inventor: Jason Hauk, O'Fallon, MO (US)

(73) Assignee: 3I AVI, LLC, Dallas, TX (US)

( * ) Notice: Subject to any disclaimer, the term of this patent is extended or adjusted under 35 U.S.C. 154(b) by 947 days.

(21) Appl. No.: 14/575,260

(22) Filed: Dec. 18, 2014

(65) Prior Publication Data

US 2015/0106212 A1 Apr. 16, 2015

Related U.S. Application Data

(63) Continuation-in-part of application No. 14/574,638, filed on Dec. 18, 2014, now abandoned, which is a continuation-in-part of application No. 14/088,939, filed on Nov. 25, 2013, now abandoned.

(60) Provisional application No. 61/918,492, filed on Dec. 19, 2013, provisional application No. 61/920,576, filed on Dec. 24, 2013, provisional application No. (Continued)

(51) Int. Cl.
| | |
|---|---|
| G06Q 30/02 | (2012.01) |
| G06Q 30/06 | (2012.01) |
| G06F 17/30 | (2006.01) |
| H04N 5/222 | (2006.01) |
| H04N 1/32 | (2006.01) |

(Continued)

(52) U.S. Cl.
CPC ... *G06Q 30/0643* (2013.01); *G06F 17/30265* (2013.01); *G06Q 30/0265* (2013.01); *G06Q 30/0623* (2013.01); *H04N 1/32133* (2013.01); *H04N 5/222* (2013.01); *G03B 15/06* (2013.01); *G03B 37/02* (2013.01); *H04N 2201/3269* (2013.01); *H04N 2201/3271* (2013.01)

(58) Field of Classification Search
CPC .......................................... G06Q 30/00–30/08
See application file for complete search history.

(56) References Cited

U.S. PATENT DOCUMENTS

| | | | |
|---|---|---|---|
| 6,809,887 | B1 | 10/2004 | Gao et al. |
| 6,817,300 | B2 | 11/2004 | Schwenker |

(Continued)

FOREIGN PATENT DOCUMENTS

AU 201400204 A1 7/2015

OTHER PUBLICATIONS

DaimlerChrysler Services Adds Internet Simulcast Technology to the Auction Block PR Newswire; New York [New York]Jun. 30, 2004: 1. (Year: 2004). Retrieved via ProQuest.*

(Continued)

*Primary Examiner* — Michael Misiaszek
(74) *Attorney, Agent, or Firm* — Stinson Leonard Street LLP

(57) ABSTRACT

A computerized exchange network makes available on the Internet collected information of items under inspection, such as goods, real estate, or the like. In one aspect, the items and collected information, such as images and videos, are added to a virtual showroom or other virtual inspection site that presents an inventory of such goods, real estate, or the like available from multiple sellers and/or locations. In another aspect, detailed objective information about the items is provided. In another aspect, a data structure includes desired criteria for a desired item and provides an alert when an item of interest matches the desired criteria.

20 Claims, 14 Drawing Sheets

Related U.S. Application Data

61/792,258, filed on Mar. 15, 2013, provisional application No. 61/732,078, filed on Nov. 30, 2012.

(51) Int. Cl.
*G03B 15/06* (2006.01)
*G03B 37/02* (2006.01)

(56) References Cited

U.S. PATENT DOCUMENTS

| | | |
|---|---|---|
| 7,465,108 B2 | 12/2008 | Brown |
| 7,631,602 B2 | 12/2009 | Schwenker |
| 7,889,931 B2 | 2/2011 | Webb et al. |
| 8,112,325 B2 | 2/2012 | Foy et al. |
| 8,830,320 B2 | 9/2014 | Swinford |
| 8,830,321 B2 | 9/2014 | Swinford |
| 8,836,785 B2 | 9/2014 | Swinford |
| 9,526,254 B2 * | 12/2016 | Sadler-Bridge ........ A01N 65/42 |
| 2001/0053284 A1 | 12/2001 | Shin |
| 2002/0010655 A1 * | 1/2002 | Kjallstrom ............. G06Q 30/02 705/26.62 |
| 2002/0026390 A1 * | 2/2002 | Ulenas ............. G06F 17/30867 705/26.1 |
| 2002/0063714 A1 | 5/2002 | Haas et al. |
| 2002/0135677 A1 | 9/2002 | Noro et al. |
| 2003/0016288 A1 | 1/2003 | Kaylor et al. |
| 2004/0183803 A1 | 9/2004 | Longo |
| 2006/0074790 A1 | 4/2006 | Anspach |
| 2009/0160930 A1 | 6/2009 | Ruppert |
| 2013/0208084 A1 | 8/2013 | Brunner et al. |
| 2013/0258045 A1 | 10/2013 | Wojciech |
| 2014/0010412 A1 | 1/2014 | Price |
| 2016/0346892 A1 | 12/2016 | Bhapkar et al. |
| 2017/0070653 A1 | 3/2017 | Irschick et al. |

OTHER PUBLICATIONS

Lavrinc, Damon, Giant New CT Scanner Creates a 3-D Image of Your Car's Guts, http://www.wired.com/autopia/2013/10/ct-scan-car-crash/, Oct. 8, 2013, 1 page.

* cited by examiner

FIG. 5A

| Criterion Identifier | Criterion Value |
|---|---|
| 502-A — Make | Any — 504-A |
| 502-B — Model | Any — 504-B |
| 502-C — Color | Red — 504-C |
| 502-D — Year | 2013 — 504-D |
| 502-E — Scratch Percentage | 0-5 — 504-E |
| 502-F — Largest Scratch Length (Inches) | 7 — 504-F |
| 502-G — Largest Scratch Width (Inches) | 0.25 — 504-G |
| 502-H — Hail Damage Percentage (Maximum) | > 15 — 504-H |
| Undercarriage Oxidization Percentage | Any |
| Interior Stain Percentage | 0-30 |
| ⋮ | ⋮ |
| 502-N — Criterion N | X — 504-N |

500

502   504

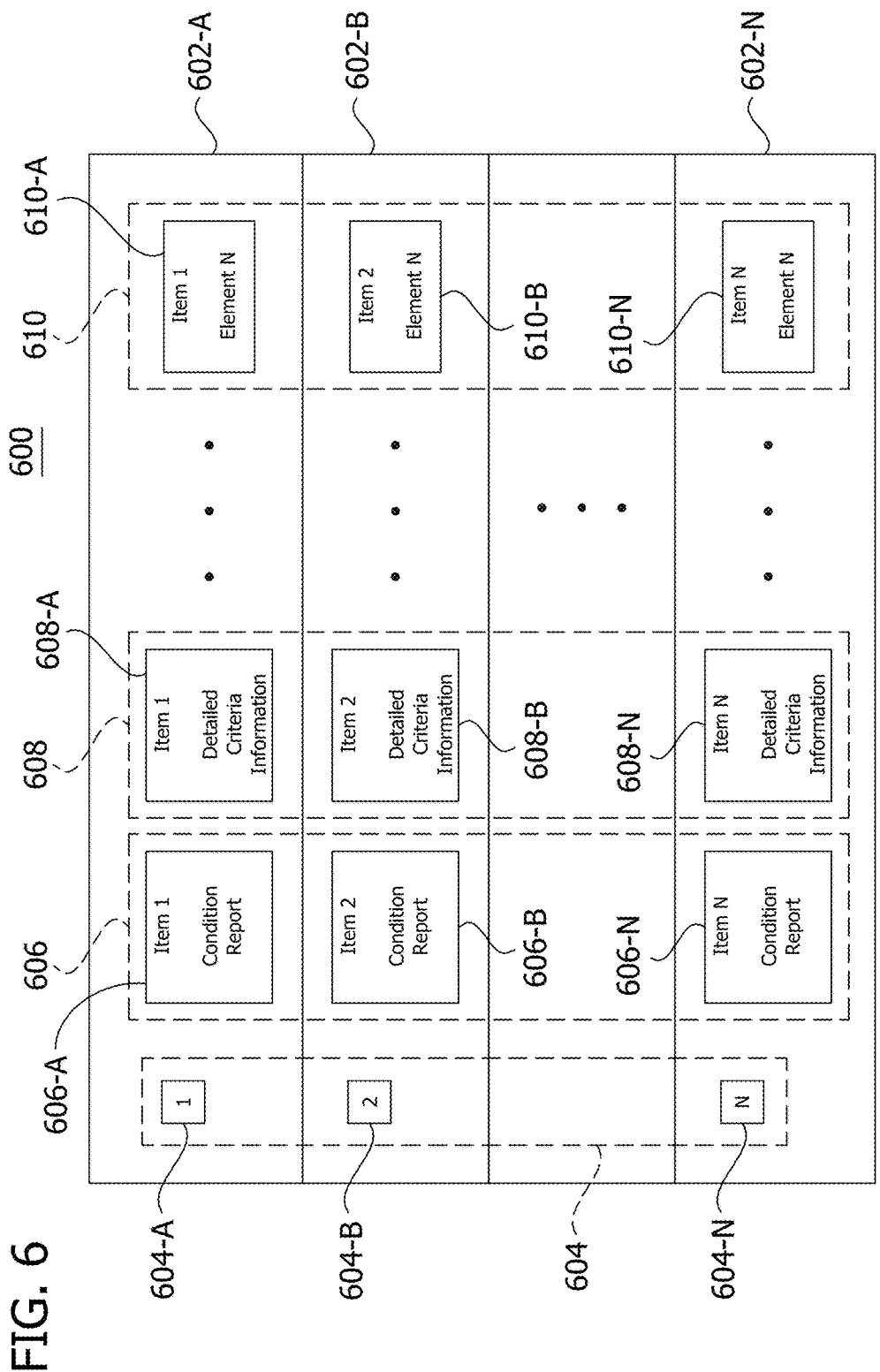

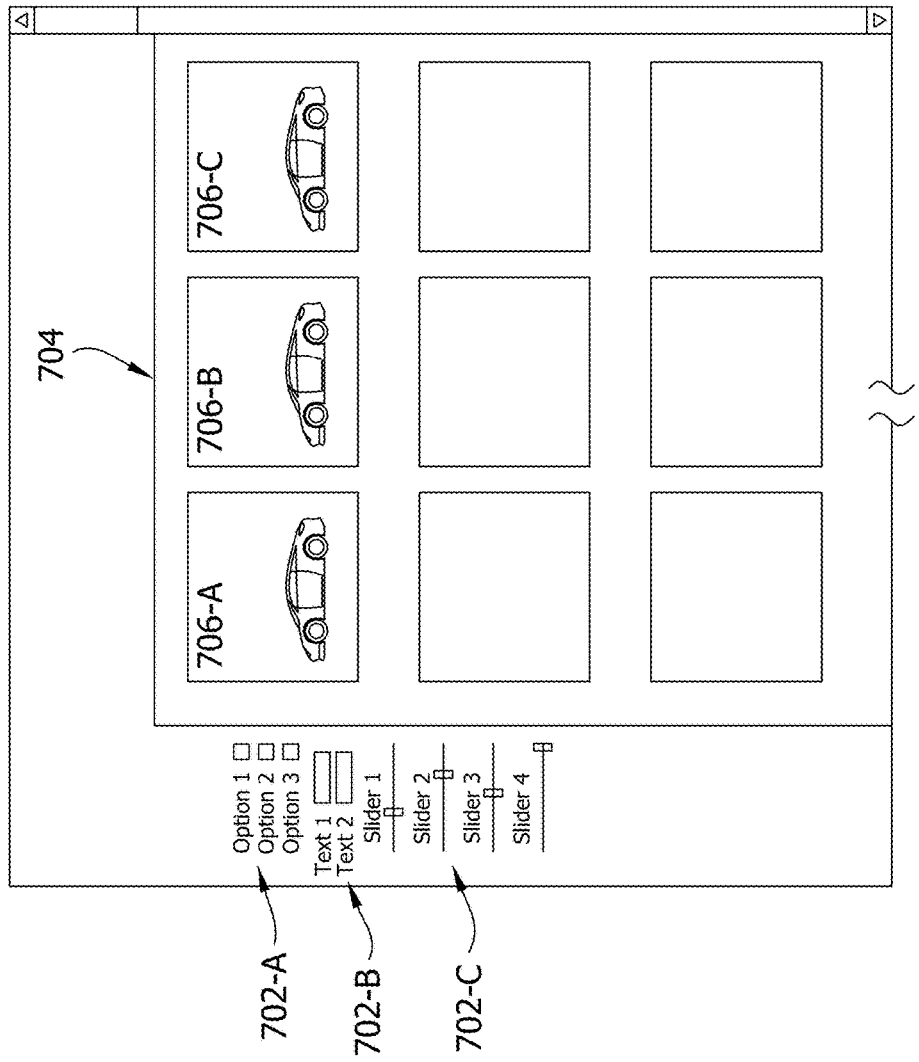

COMPUTERIZED EXCHANGE NETWORK

CROSS-REFERENCE TO RELATED APPLICATIONS

This application claims the benefit of U.S. Provisional Patent Application Ser. No. 61/918,492 filed Dec. 19, 2013 and U.S. Provisional Patent Application Ser. No. 61/920,576 filed Dec. 24, 2013, and is a continuation-in-part of U.S. patent application Ser. No. 14/574,638 filed Dec. 18, 2014, which is a continuation-in-part of U.S. patent application Ser. No. 14/088,939 filed Nov. 25, 2013, which claims the benefit of U.S. Provisional Patent Application Ser. No. 61/792,258 filed Mar. 15, 2013 and U.S. Provisional Patent Application Ser. No. 61/732,078 filed Nov. 30, 2012, the entire disclosures of which are incorporated herein by reference for all purposes.

BACKGROUND

Items, such as goods and real estate, are usually held open for inspection or sale in one of two ways. The first, a traditional approach, includes holding an inventory of the items at a physical location. This approach involves visiting a dealer or merchant's place of business, listening to a salesperson's pitch, viewing or testing selected goods, and then haggling over price. Similarly, consumers purchase real estate by the traditional approach by visiting and touring the real estate and then haggling over price. This approach advantageously provides consumers an opportunity to view the particular product or real estate in-person and receive hands-on demonstrations of features and options or the ability to view it in its entirety. However, this approach is time-consuming and interacting with a salesperson can be intimidating for many consumers.

The second approach involves a "virtual showroom" in which items are held in an inventory where consumers can research and price goods, real estate, and the like on the Internet. This approach advantageously allows consumers to search for items for sale, such as goods or real estate, in less time and with less salesperson interaction than the traditional approach. Unfortunately, when visiting a virtual showroom, consumers are often limited to stock photographs and generic information and must forego the more traditional "walk around" experience. Consequently, even if actual photographs and/or videos of a particular product, real estate, or the like are available, they are often limited in scope and cannot adequately convey how a product or real estate appears in-person and its actual condition. For example, the information available is often non-specific and relates generally to a make and model rather than specifically to the particular item. In other words, consumers sacrifice advantageous aspects of the traditional goods or real estate purchasing approach in order to enjoy the convenience and other advantages of the virtual showroom approach.

Moreover, many virtual showroom sellers often employ a "no haggle" pricing model. As a result, it becomes important for virtual sellers to make a high volume of sales. A virtual showroom seller attempting to make a high volume of sales must quickly acquire information about goods or real estate in its inventory, including photographs, videos, and/or other information indicative of the condition of the goods or real estate, and make that information available to consumers on the Internet. Conventional systems and methods are unable to acquire photographs and/or videos of goods or real estate and post them on the Internet with the necessary throughput to keep up with the quick turnaround of high-volume sales.

In addition, the limited scope of information available about items in a virtual showroom leads to increased bandwidth usage in communications networks, such as the Internet, increased processing load in devices hosting the virtual showroom, and decreased power availability in batteries powering devices on which the virtual showroom is displayed. For example, the limited scope of information provides fewer categories with which to distinguish among item entries in the virtual showroom. Accordingly, more entries will satisfy a consumer's desired criteria, which lead to more entries being accessed and displayed.

SUMMARY

In accordance with aspects of the invention, a computerized exchange network makes available on the Internet collected images and/or videos of items under inspection, such as goods, real estate, or the like. An aspect of this end-to-end solution captures images and other information of an item under inspection, processes and stores the images and information, and adds the item to a virtual showroom or other virtual inspection site that presents an inventory of such goods, real estate, or the like. This aspect of the solution provides users with extensive information about the particular items under inspection. For example, users, such as consumers, can inspect goods or real estate fixtures available in the inventory along with the traditional benefits of a virtual showroom. Further, this aspect of the solution provides sellers with a user-friendly and quick (e.g., 7 minutes or less per good or fixture) way of acquiring images and information of a particular good or real estate fixture and creating a virtual showroom to display it. This aspect makes high-volume "no-haggle" sales tactics economical to employ among a network of sellers. Further, this aspect reduces network bandwidth usage in communications networks and reduces utilization of computing resources in computing devices storing acquired images and information.

In an aspect, a system for rendering a virtual showroom comprises a front-end information acquisition device for acquiring one or more images of an item of interest. The system further comprises a database for storing data representing the acquired images, a detailed criteria data structure that includes data representing objective information about the item of interest, and a desired criteria data structure that includes data representing objective information about a desired item.

In another aspect, a system for determining a criterion value associated with a criterion identifier for an item of interest is provided. The system includes a memory storage component for providing data representing an image of an item of interest, in which the item of interest has an attribute defined by the criterion identifier and the associated criterion value. In addition, a criterion identifier component for providing the criterion identifier, a value determination component for ascertaining the corresponding criterion value of the criterion identifier from the data representing the image of the item of interest, and a criterion value component for providing the ascertained criterion value are provided.

In yet another aspect, a system is provided for determining satisfaction of an actual criterion value of an item of interest that includes a criterion identifier component for providing a criterion identifier associated with both the actual criterion value and a desired criterion value for a desired item. Further included is a desired criterion value component for providing data representing the desired criterion value, an actual criterion value component for providing data representing the actual criterion value, and a match component. In the system, the match component is configured to perform a comparison of the data representing the desired criterion value and the data representing the actual criterion value.

Other objects and features will be in part apparent and in part pointed out hereinafter.

BRIEF DESCRIPTION OF THE DRAWINGS

FIG. 5A is a block diagram illustrating a data structure for criterion identifiers and associated criterion values for a desired item according to an embodiment of the invention.

FIG. 6 is a block diagram illustrating a data structure for a plurality of items of interest according to an embodiment of the invention.

FIG. 7 illustrates an exemplary user interface inventory display in accordance with an embodiment of the invention.

Corresponding reference characters indicate corresponding parts throughout the drawings.

DETAILED DESCRIPTION

Figure 1:
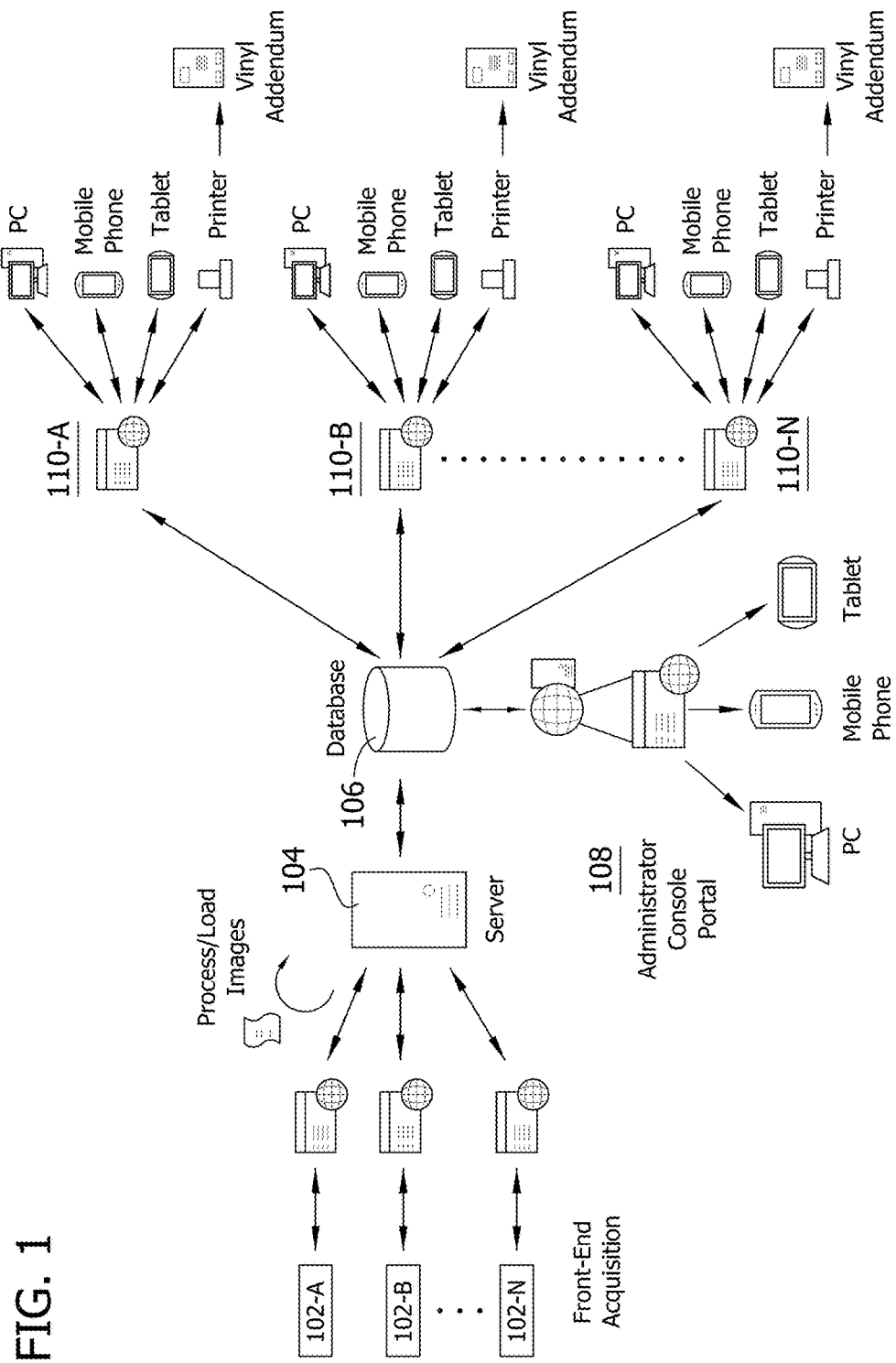
FIG. 1 is a diagram of a communication network environment in which aspects of the invention may be implemented.

FIG. 1 illustrates an exemplary communication network environment for implementing aspects of the present invention. In accordance with aspects of the present invention, collected images and/or videos of objects or scenes are inventoried and made available via the Internet in a virtual showroom, for example.

In an embodiment, the exemplary communication network includes front-end information acquisition components 102-A, 102-B, and 102-N, a server 104, a database 106, an administrator console portal 108, and end-user console portals 110-A, 110-B, and 110-N. The front-end information acquisition components 102 are each communicatively connected to the server 104. As shown in FIG. 1, server 104 is communicatively connected to the database 106, which is communicatively connected to the administrator console portal 108 and the end-user console portals 110. Exemplary communicative connections include a telecommunications network utilizing the Internet Protocol communications protocol, such as the Internet, or a communications channel employing serial and/or parallel communications methods. In an embodiment, aspects of the exemplary communication network can be operated remotely and permit complete integration from end-to-end, ensuring a centralized data repository that is scalable for future growth.

The components of the exemplary communication network provide an end-to-end solution in which images and other information of a particular object are acquired, processed, stored, and used to create an entry for the object in a virtual showroom 700 (FIG. 7), all with minimal human effort and in a short enough period of time to make a high volume of image and information acquisitions economically feasible. In an aspect, the embodiment illustrated in FIG. 1 provides simplicity and portability and employs software that can be utilized across multiple sites and platforms and is easy to use, install, and support. Contemplated objects include, by way of example and not limitation, automobiles, boats, watercraft, recreational vehicles, motorcycles, all-terrain vehicles, trailers, aircraft, vessel interiors, real estate and associated structures and fixtures, and the like. Beneficially, improvements are provided in the fields of automated object imaging, online marketplaces, and transportation maintenance and safety by providing a means to collect and inventory images and other information in a small amount of time and with little or no human involvement. Further advantages include increased user efficiency, reduced network bandwidth usage, and reduced computing resource utilization due to the decrease in the amount of time required to locate a particular item of interest.

According to aspects of the invention, front-end information acquisition components 102 are adapted for acquiring images of an object of interest. As used herein, images include still photographs (e.g., snap shots), moving photographs (e.g., videos or movies), panoramics, stereoscopic photographs, infrared images, or any combination thereof. In addition to acquiring images of an entire object, images of only a portion of an object may be acquired. For example, front-end information acquisition components 102 are configured for taking images of identifying information or any areas of the object that are particularly noteworthy, such as damaged areas, areas most likely to be damaged, identification numbers, and the like. It is also contemplated that a salesperson can provide a video demonstration of the object's features and options to be integrated into a comprehensive condition report (FIG. 2) or a virtual showroom or inventory (FIGS. 6 and 7). Exemplary front-end information acquisition components 102 include those described in U.S. patent application Ser. No. 14/574,638, incorporated herein by reference above.

The server 104 of FIG. 1 hosts (e.g., stores and/or distributes) acquired images and information for use by consumers or sellers via the Internet. Server 104 receives acquired images from front-end information acquisition components 102 and stores them on computer-readable media. In an embodiment, server 104 inventories, compresses, stitches, or otherwise processes the received images in addition to, or in the absence of, such actions by front-end information acquisition components 102. Further embodiments of server 104 are disclosed herein and in U.S. patent application Ser. No. 14/088,939, incorporated herein by reference above.

Referring further to FIG. 1, database 106 is associated with server 104 for organizing stored images and content. Database 106 may reside on server 104 or on an external computing device that is connected to server 104 via a communications channel. Database 106 stores the acquired images along with metadata or other corresponding information relating to the images and/or the objects themselves. For example, database 106 may store information corresponding to imaged vehicles including, by way of example and not limitation, vehicle stock number, VIN number, vehicle color, vehicle make, vehicle model, vehicle type, objective vehicle condition information, and the like. In one embodiment, the information contained in database 106 is used with a website template stored on server 104 or an external server for showcasing the objects to consumers via a virtual showroom. In an aspect, database 106 provides a common location for multiple sellers to make their inventories mutually available. Database 106 is capable of using various standards, such as SQL, ODBC, and JDBC, for example. Exemplary database management systems (DBMS) include MySQL, Microsoft SQL Server, Oracle, and SAP. Database 106 and the information it contains is accessible via the Internet, such as through the use of a web browser or an API. Further embodiments of database 106 are disclosed herein and in U.S. patent application Ser. No. 14/088,939, incorporated herein by reference above.

As shown in FIG. 1, administrator console portal 108 provides a means for managing information stored in database 106 and/or on server 104. In one embodiment, the information contained in database 106 is used with administrator console portal 108 stored on server 104 or an external server for managing an inventory of objects or acquired images to be displayed on in a virtual showroom. Such an inventory management application advantageously allows for easily tracking the progress of an object among the various stages of image acquisition by front-end information acquisition components 102, image processing by server 104, and inventory creation by server 104 and/or database 106, for example. In one embodiment, a seller can execute an administrator console portal 108 application remotely (e.g., via a web application) to provide an automated ticketing process for tracking object progress. Administrator console portal 108 also provides metrics and reporting data and tracks objects, customers, and process information, in one embodiment. In additional embodiments, administrator console portal 108 provides access to detailed logs and reporting to troubleshoot object-processing errors. The metadata and other corresponding information relating to the images and/or the objects permit a determination to be made about the location of image and video files. Further embodiments of administrator console portal 108 are disclosed herein and in U.S. patent application Ser. No. 14/088,939, incorporated by reference above.

The end-user console portals 110 shown in FIG. 1 provide a means for users, such as consumers or sellers, to access the acquired images, content, and information stored in database 106. In one embodiment, end-user console portals 110 are computing devices, such as a personal computer, a mobile device, a tablet computing device, and the like. In another embodiment, end-user console portals 110 include printing devices for vinyl addenda, as further described below and in U.S. Patent Application Ser. No. 61/920,576, incorporated herein by reference above. Further embodiments of end-user console portals 110 are disclosed herein and in U.S. patent application Ser. No. 14/088,939, incorporated herein by reference above. It is to be understood that the users of end-user console portals 110 need not be purchasers of goods or real estate. Instead, such users may include inspectors, inventory/property managers, maintenance personnel, etc. Further, a user may be non-human, such as a system or apparatus that controls a technological process. It is also contemplated that in an embodiment, access by end-user console portal 110 to database 106 and/or server 104 is dependent upon the payment of a fee. In an additional embodiment, access of end-user console portals 110 to database 106 and/or server 104 depend upon successful authentication of end-user console portals 110, such as through the use of a password.

Figure 2:
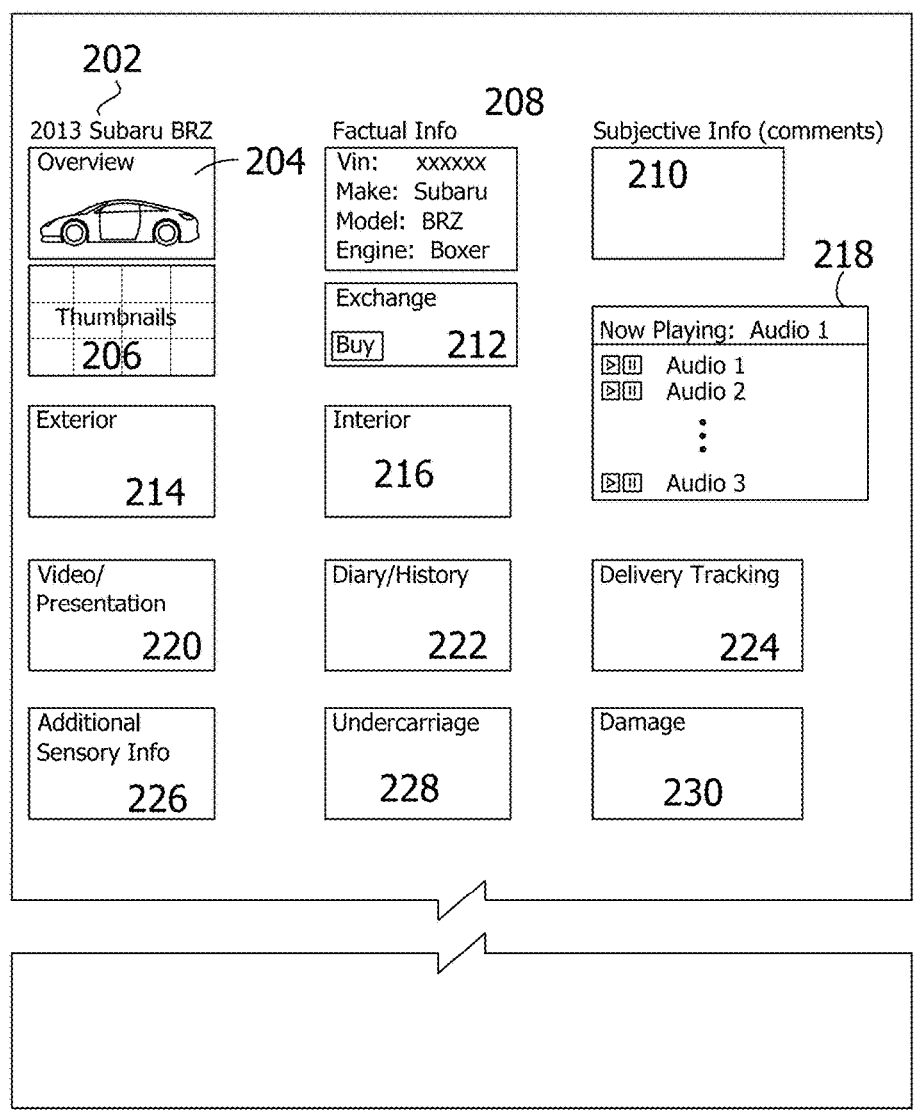
FIG. 2 illustrates a comprehensive condition report in accordance with an embodiment of the invention.

FIG. 2 illustrates a comprehensive condition report, generally indicated at 200, embodying aspects of the present invention. In accordance with aspects of the present invention, the comprehensive condition report 200 provides detailed information about an item of interest and/or articles that comprise an item of interest. In one embodiment, comprehensive condition report 200 includes information acquired by front-end information acquisition components 102 and is adapted for displaying on a graphical user interface (GUI) of devices that comprise end-user console portals 110 and/or administrator console portal 108.

In the embodiment of FIG. 2, comprehensive condition report 200 includes an item identifier 202, an item overview component 204, alternate view image thumbnails 206, a factual information component 208, a subjective information component 210, an exchange component 212, an exterior interactive panoramic image 214, an interior interactive panoramic image 216, an audio component 218, a video component 220, an item history component 222, a delivery tracking component 224, a sensory information component 226, an undercarriage component 228, and a damage component 230. In one embodiment, comprehensive condition report 200 contains components and/or information conveyed via multiple content formats. For example, information may be conveyed via audio, visual, text, and like formats. It is to be understood that comprehensive condition report 200 includes any combination of components without deviating from the scope of the invention.

The item identifier 202 is adapted for associating comprehensive condition report 200 with a particular item of interest about which comprehensive condition report 200 provides information. In the embodiment of FIG. 2, item identifier 202 is text that includes a year of manufacture, a make, and a model of a vehicle about which comprehensive condition report 200 provides information. It is contemplated that other information, such as a VIN number and the like, may also be used. In one embodiment, item identifier 202 allows for the unique identification of comprehensive condition report 200 among other comprehensive condition reports, such as in an inventory of comprehensive condition reports in a virtual showroom, for example. Item identifier 202 may also comprise an image, a video, or other content formats that allow comprehensive condition report 200 to be identified and associated with an item of interest. In another embodiment, item identifier 202 corresponds to one of identification fields 604 (e.g., 604-A), described further below with respect to FIG. 6, for identifying an item among a plurality of items in an inventory data structure. In an embodiment, condition report 200 and the exemplary communication network environment of FIG. 1 enable a plurality of sellers to maintain information about their inventories in a common location. For example, multiple sellers may utilize front-end information acquisition components 102 and/or end-user console portals 110 to each store an inventory of comprehensive condition reports 200 in database 106 such that the inventories are pooled together for access via end-user console portals 110.

As shown in FIG. 2, the item overview component 204 is adapted for providing a visual summary of the item of interest. In the embodiment illustrated by FIG. 2, item overview component 204 is an image of a vehicle that is the item of interest. Item overview component 204 allows a user to visually recognize the item of interest, which may allow for easier or faster recognition or offer more information than item identifier 202. In additional embodiments, item overview component 204 may comprise other content formats, such as a video, that provide a visual summary of the item of interest. In another embodiment, item overview component 204 may display images and/or videos of specific portions of the item of interest, such as those depicted in alternate view image thumbnails 206, described below.

The alternate view image thumbnails 206 shown in FIG. 2 are adapted for providing a means for users to access additional images and/or videos of the item of interest. In one embodiment, alternate view image thumbnails 206 display additional images that depict the item of interest from various angles or depict certain articles that comprise the item of interest. For example, alternate view image thumbnails 206 may depict a vehicle viewed from a side view, a forty-five degree angle view, and the like. Alternate view image thumbnails 206 may also depict a logo, a door handle, a scratch, a dent, and the like. In one embodiment, a selected one of alternate view image thumbnails 206 is displayed in item overview component 204. In another embodiment, a selected one of alternate view image thumbnails 206 is displayed in a pop-up window on a GUI, such as alert 802, described further below with respect to FIG. 8. In yet another embodiment, one or more of alternate view image thumbnails 206 may display a stock image in a grayscale format to indicate that a corresponding image of the item of interest is not available.

The factual information component 208 is adapted for providing objective information about the item of interest. In the embodiment illustrated by FIG. 2, factual information component 208 provides a VIN, a make, a model, and an engine type of a vehicle in a text format. Additional objective and factual information may also be provided by factual information component 208, such as a percentage of the vehicle that contains scratches or damage, scratch dimensions, hail damage information, stain information, and the like. Further, factual information component 208 may provide objective information in additional content formats, such as images and videos. Beneficially, objective information provided by factual information component 208 results in decreased network bandwidth usage Referring further to the embodiment shown in FIG. 2, the subjective information component 210 is adapted for providing subjective information about the item of interest. In one embodiment, subjective information component 210 provides statements that are ambiguous or subject to interpretation, such as "minor damage" and "great buy," for example. In accordance with one aspect of the invention, subjective information component 210 allows a seller to provide information about the item of interest that may influence a potential purchaser, while also allowing the potential purchaser to identify this information as being separate from objective information provided by factual information component 208.

The exchange component 212 is adapted for providing the ability to engage in a transaction involving the item of interest. For example, the transaction may be a purchase, a sale, or an in-kind exchange of the item of interest. In one embodiment, exchange component 212 may be utilized to purchase the item of interest about which comprehensive condition report 200 provides information by selecting a GUI button.

The embodiment of FIG. 2 further illustrates the exterior interactive panoramic image 214, which is adapted for depicting a 360-degree view of the exterior of the item of interest. In one embodiment, exterior interactive panoramic image 214 displays a continuous image that is comprised of individual images that have been stitched together by computer-executable instructions executing on a processor in front-end information acquisition components 102 and/or server 104. In one embodiment, exterior interactive panoramic image 214 is capable of being manipulated by a user so as to view different parts of the image via scrolling, panning, and zooming. For example, a human interface device (e.g., a mouse) may be utilized to manipulate exterior interactive panoramic image 214 in order to spin the item of interest. In another embodiment, exterior interactive panoramic image 214 provides a user with the ability to view information about the entire exterior of the item of interest in a visual format. In an exemplary embodiment, rather than displaying a subjective statement from a seller that a vehicle has "minor damage on the front driver-side door," exterior interactive panoramic image 214 provides a way for a user to view the damage in an objective manner.

The interior interactive panoramic image 216 is adapted for depicting a 360-degree view of the interior of the item of interest. According to one embodiment, interior interactive panoramic image 216 depicts a continuous image that is comprised of individual images that have been stitched together by computer-executable instructions executing on a processor in front-end information acquisition components 102 and/or server 104. In a further embodiment, a user may manipulate interior interactive panoramic image 216 by scrolling, panning, and zooming. In one embodiment, interior interactive panoramic image 216 displays information about the entire interior of the item of interest in a visual format. For example, interior interactive panoramic image 216 may provide a way to present a detail in an objective manner, instead of relying on a statement from a seller that a vehicle has "slight discoloration on the rear passenger-side seat."

As additionally shown in FIG. 2, the audio component 218 is adapted for providing information about the item of interest in an audio content format. In one embodiment, the information provided by audio component 218 is objective, such as a sound recording of engine noise or brake squeaking of a vehicle, for example. In another embodiment, the information provided by audio component 218 may be subjective, such as a sound recording of a seller's opinions or thoughts about the item of interest, for example. Advantageously, information provided in an audio format allows a user to acquire in-depth information about the item of interest, which contributes to user efficiency when viewing comprehensive condition report 200 on a GUI. Further, increased user efficiency leads to reduced network bandwidth usage in a communication network transmitting or receiving comprehensive condition report 200, including audio component 218.

The video component 220 is adapted for providing a video presentation of the item of interest. In one embodiment, video component 220 displays moving photographs (e.g., videos or movies) of the item of interest in response to a command provided by the user via a GUI. In the embodiment illustrated by FIG. 2, video component 220 provides a video presentation as one subset of comprehensive condition report 200 on a GUI. In another embodiment, video component 220 may provide a video presentation in a pop-up window on a GUI, such as alert 802, described further below with respect to FIG. 8. In further embodiments, a video presentation provided by video component 220 may include a salesperson or the like explaining features of the item of interest or a like video showcasing the item of interest.

The following exemplary computer-executable instructions provide buttons on a GUI for pulling a graphic and a video from server 104 and displaying a video presentation by video component 220:

```
<li><a href="#"
onclick="javascript:window.open('http://sharpcarsmedia.com/buttons/Ex.MOV',
'_blank',          'status=yes,top=0,left=0,width=640,height=480');"><img
src="http://sharpcarsmedia.com/buttons/ex2.jpg" alt=" "/></a></li>
<li><a href="#"
onclick="javascript:window.open('http://sharpcarsmedia.com/buttons/int.swf',
'_blank',          'status=yes,top=0,left=0,width=640,height=480');"><img
src="http://sharpcarsmedia.com/buttons/pano2.jpg" alt=" "/></a></li>
<li><a href="#"
onclick="javascript:window.open('http://sharpcarsmedia.com/buttons/pre.mov',
'_blank',          'status=yes,top=0,left=0,width=640,height=480');"><img
src="http://sharpcarsmedia.com/buttons/242.jpg" alt=" "/></a></li>
```

Referring further to FIG. 2, the item history component 222 is adapted for providing historical information relating to the item of interest. In one exemplary embodiment, item history component 222 provides information about a vehicle of interest, including, but not limited to, its manufacture, damage, repairs, ownership, and the like. For example, item history component 222 may provide images of a vehicle of interest during and after its manufacture, before transportation to a certain location, and after it has arrived at the certain location. In this manner, item history component 222 provides a detailed account with objective information about the status or condition of the item of interest at discrete points in time. In another embodiment, item history component 222 provides information about the deterioration of an item over time. The information provided by item history component 222 may be in various content formats, such as images, videos, text, audio, and the like.

The delivery tracking component 224 is adapted for providing information about the transport or location of the item of interest. In one exemplary embodiment, delivery tracking component 224 provides a user with information concerning the physical location of the item of interest at a current time and at times in the past. Further, delivery tracking component 224 may provide information about an expected future physical location of the item of interest. The information provided by delivery tracking component 224 may be in various content formats, such as images (e.g., maps), videos, text, audio, and the like.

Still referring to the embodiment of FIG. 2, the sensory information component 226 is adapted for providing information that may be sensed by a user of comprehensive condition report 200. Exemplary sensory information includes, but is not limited to, visual, auditory (e.g., hearing), somatic sensations (e.g., touch, tactile perception), and vestibular (e.g., balance, movement). In one exemplary embodiment, sensory information component 226 provides a tactile perception of the material covering the seats inside a vehicle of interest via actuation of a touch-screen device on which comprehensive condition report 200 is displayed. In a further exemplary embodiment, sensory information component 226 provides a tactile perception that conveys the body style of a vehicle of interest when visual information provided by item overview component 204, for example, is unavailable (e.g., technical failure or vision impairment of a user).

The undercarriage component 228 is adapted for providing information about a portion of the item of interest that may not be provided by other components of comprehensive condition report 200. In one embodiment, undercarriage component 228 provides images of the undercarriage of a vehicle of interest such that objective information is available about the undercarriage of the vehicle.

Referring further to the embodiment shown in FIG. 2, the damage component 230 is adapted for providing information about damage to the item of interest. In one embodiment, damage component 230 provides information about hail damage to a vehicle of interest via images of the hail damaged vehicle. The information provided by damage component 230 may be in various content formats, such as images, videos, text, audio, and the like. Information provided by damage component 230 in the form of images or videos may depict damage to the item of interest as captured by techniques that use electromagnetic radiation other than visible light, such as X-rays and infrared, for example. Moreover, information provided by damage component 230 may utilize a distance transform or a signed distance function, for example to create a three-dimensional model of the item of interest and its damage. Beneficially, such techniques may provide detailed objective information about the damage that may not be readily available via a visible light image alone.

One embodiment of comprehensive condition report 200 results in a benefit of reduced network bandwidth usage. This embodiment results in reduced network bandwidth usage when the item of interest about which comprehensive condition report 200 provides information meets a particular need and additional comprehensive condition reports for additional items are not accessed from database 106 and/or server 104. For example, finite communications network resources may then be utilized to carry out other tasks. Such an embodiment also reduces the usage of computing resources by server 104 while still providing users with desired information about a desired item or item of interest. Further, the increased user efficiency provided by comprehensive condition report 200 results in reduced usage of stored electrical energy in a battery powering a GUI of components in end-user console portals 110, such as mobile phones and tablets. In another embodiment, comprehensive condition report 200 provides detailed objective information about an item of interest that allows consumers to realize advantageous aspects of both the traditional goods or real estate purchasing approach and the virtual showroom approach.

Figure 3A:
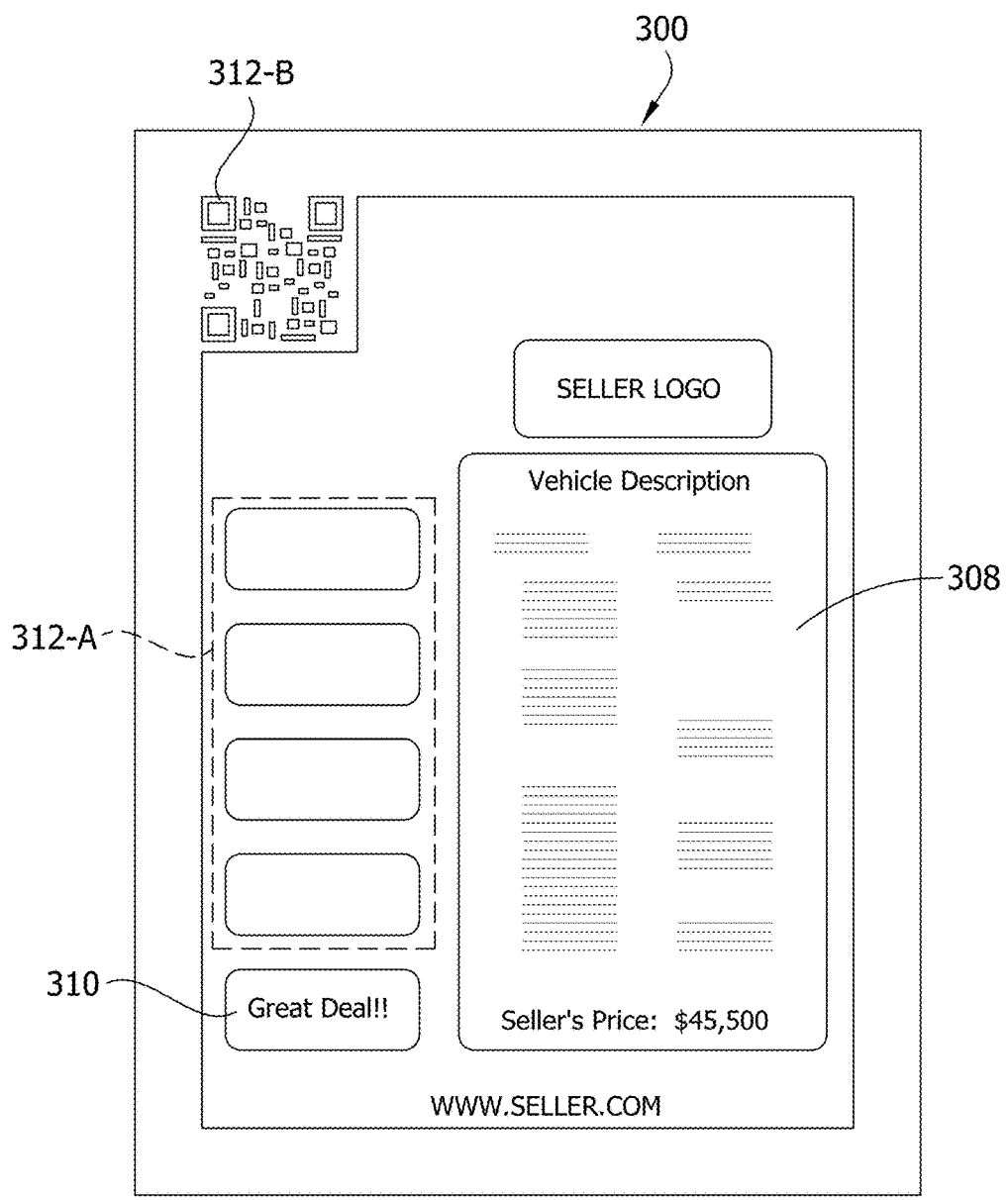
FIG. 3A is an exemplary addendum printed on vinyl in accordance with an embodiment of the invention.

FIG. 3A illustrates an exemplary vinyl addendum 300 in accordance with an embodiment of the invention. In one embodiment, the vinyl addendum 300 includes the entirety of and/or certain portions or components of comprehensive condition report 200. In the embodiment shown by FIG. 3A, vinyl addendum 300 is an information sheet including a factual information component 308, a subjective information component 310, and exchange components 312-A and 312-B. Vinyl addendum 300 has dimensions of 8.25 inches horizontal by 11.25 inches vertical. In one embodiment, the vinyl portion of vinyl addendum 300 is heavy-duty and allows for exterior use in all types of weather conditions. Beneficially, a suitable vinyl will greatly reduce, or completely eliminate, the likelihood of vinyl addendum 300 chipping or peeling. In a further embodiment, the factual information component 308, the subjective information component 310, the exchange components 312-A and 312-B, and/or additional articles are printed on vinyl addendum 300 with environmentally friendly, high-color, and vivid inks. Such colorfast printing lasts a minimum of one year, which eliminates showing, or giving an impression to the consumer, that the item of interest has been for sale for an extended length of time. Thus, the article of interest is provided with increased appeal to consumers, which results in a benefit to sellers, such as through increased profit in one exemplary embodiment.

The factual information component 308 is adapted for providing objective information about the item of interest. In the embodiment illustrated by FIG. 3A, factual information component 308 provides information such as VIN, make, model, manufacturer, accessories, and specifications of a vehicle of interest in a visual text format. Additional objective and factual information may also be provided by factual information component 308, such as a percentage of the vehicle that contains scratches or damage, scratch dimensions, hail damage information, stain information, and the like. Further, factual information component 308 may provide objective information in additional visual content formats, such as images and the like.

Referring further to the embodiment shown in FIG. 3A, the subjective information component 310 is adapted for providing subjective information about the item of interest. In the embodiment illustrated by FIG. 3A, subjective information component 310 provides the statement "GREAT DEAL!!" in a visual text format. It is contemplated that subjective information component 310 may provide statements that are ambiguous or subject to interpretation, such as "minor damage" and "you won't be disappointed," for example. In accordance with one aspect of the invention, subjective information component 310 provides a seller with the ability to convey information about the item of interest that may influence a potential purchaser, while also allowing the potential purchaser to identify this information as being separate from objective information provided by factual information component 308. Additionally, subjective information component 310 may provide subjective information in additional visual content formats, such as images and the like.

The exchange components 312 are adapted for providing information that facilitates a transaction involving the item of interest. For example, a transaction may be a purchase, a sale, or an in-kind exchange of the item of interest. In the embodiment shown by FIG. 3A, exchange component 312-A provides information in a visual text format about the terms of a transaction involving a vehicle of interest. Exchange component 312-B of FIG. 3A provides a quick response (QR) code that may be scanned or imaged with a device, such as those associated with end-user console portals 110. In one embodiment, exchange component 312-B is scanned with a device of end-user console portal 110 to access inventory data structure 600 from database 106 and display a comprehensive condition report 200, including exchange component 212, in a GUI on a display of the device of end-user console portal 110. In another embodiment, an administrator may scan exchange component 312-B with a device, such as those associated with administrator console portal 108, to access inventory data structure 600 from database 106. In one embodiment, exchange component 312-B is unique to the particular item of interest.

Figure 3B:
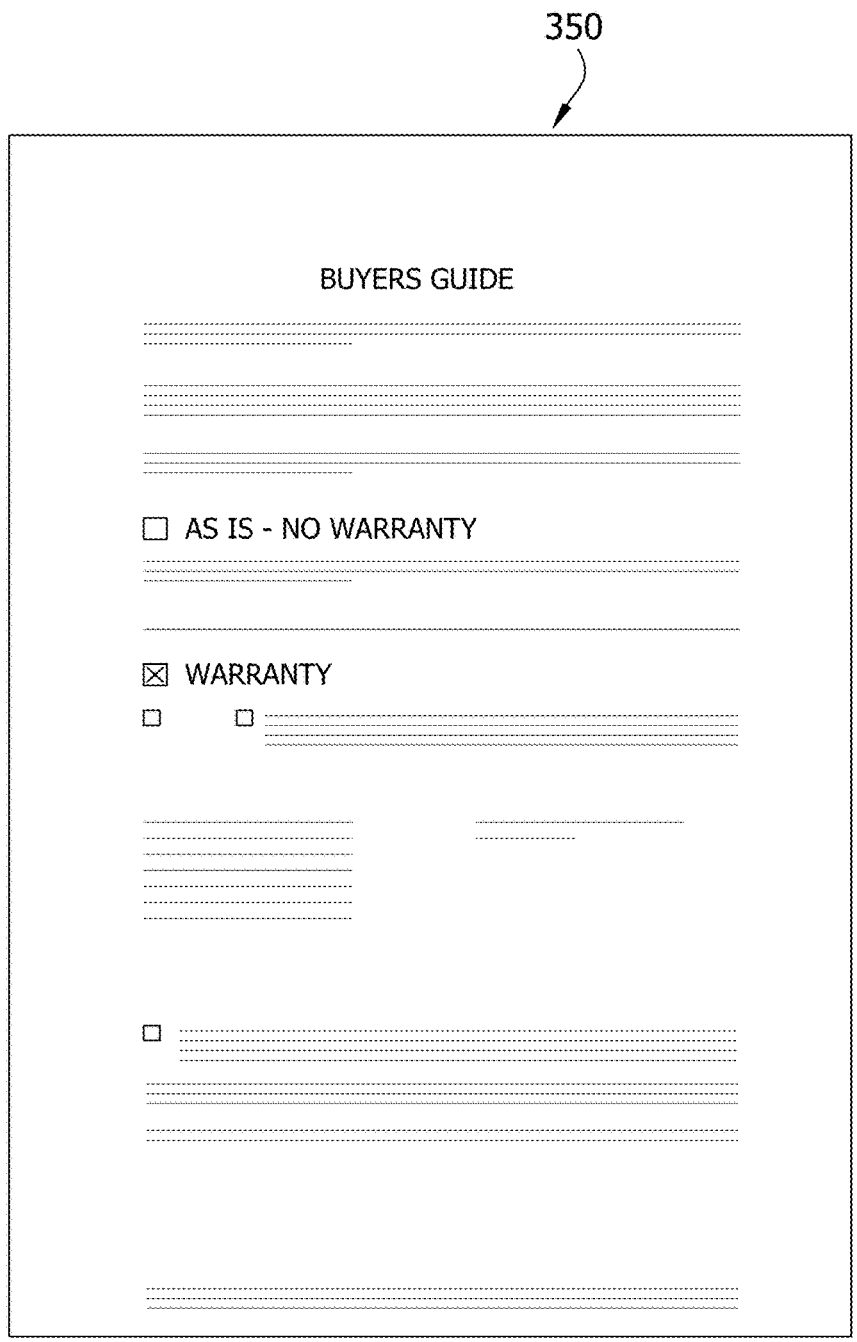
FIG. 3B is an exemplary buyers guide printed on vinyl in accordance with an embodiment of the invention.

FIG. 3B illustrates an exemplary buyers guide printed on vinyl, generally indicated at 350, in accordance with an embodiment of the invention. The illustrated buyers guide is an information sheet measuring 8.25 inches horizontal and 11.25 inches vertical and listing warranty information for a vehicle as a federal mandate for consumer protection. The illustrated form notifies prospective consumers of the existence of a warranty or no warranty status of the vehicle to which the form is attached. In another embodiment, the buyers guide may be a Monroney sticker. According to one embodiment of the present invention, the vinyl on which the buyers guide is printed is heavy-duty and allows for exterior use in all types of weather conditions. Beneficially, a suitable vinyl will greatly reduce, or completely eliminate, the likelihood of the vinyl addendum chipping or peeling. Moreover, the buyers guide may be printed on vinyl with environmentally friendly, high-color, and vivid inks. Such colorfast printing lasts a minimum of one year, which eliminates showing, or giving an impression to the consumer, that the item of interest has been for sale for an extended length of time. Thus, the article of interest is provided with increased appeal to consumers, which results in a benefit to sellers.

In an embodiment, exemplary vinyl addendum 300 and/or exemplary buyers guide 350 are affixed to the window of a vehicle corresponding to the addendum and the buyers guide. Beneficially, the vinyl on which the addendum and buyers guide are printed does not have its adherence to the window affected by movement of the window, such as when it is rolled down. Advantageously, the vinyl stays sharp, crisp, and as good as new, rather than becoming wrinkled or destroyed, such as via condensation.

Figure 4A:
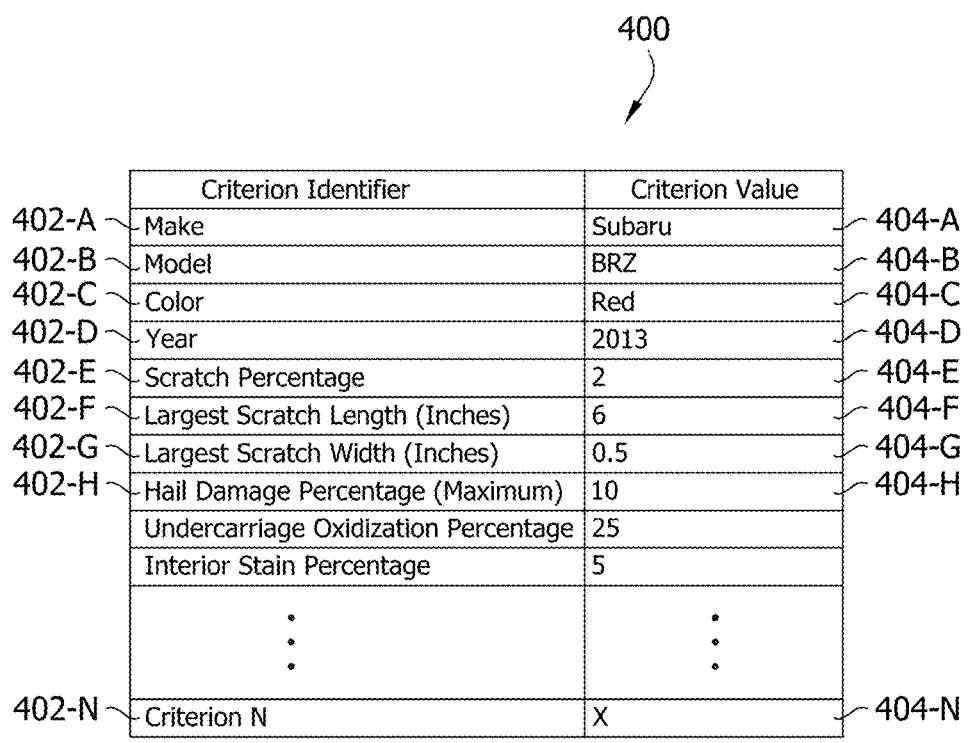
FIG. 4A is a block diagram illustrating a data structure for criterion identifiers and associated criterion values for an item of interest according to an embodiment of the invention.

FIG. 4A illustrates a detailed criteria data structure 400, for criterion identifiers and corresponding values that are associated with an item of interest, in accordance with an embodiment of the invention. In one embodiment, detailed criteria data structure 400 is adapted to provide data representing an item of interest in an objective manner.

The detailed criteria data structure 400 comprises a first group of criterion identifier fields 402, which include data that represents various criterion identifiers by which the item of interest may be identified or evaluated. For example, the criterion identifier fields 402 may include data representing criterion identifiers that ascertain the item of interest, such as a VIN, make, model, and the like of a vehicle. Further, criterion identifier fields 402 may include data representing evaluating criteria such as a percentage of an item of interest that is damaged and dimensions of damaged areas. It is to be understood by one skilled in the art that criterion identifier fields 402 may also include data representing evaluating criteria that are subjective, such as condition categories and opinions on the value of the item of interest.

Referring further to FIG. 4A, the detailed criteria data structure 400 also has a second group of criterion value fields 404 including data that represents values associated with a corresponding criterion identifier field 402. For example, the criterion identifier field 402-C includes data representing a criterion identifier of "color" and corresponding criterion value field 404-C includes data representing a value of "red."

In one embodiment, detailed criteria data structure 400 is stored in database 106 on server 104. In a further embodiment, criterion identifier fields 402 and criterion value fields 404 include data that is presented to a user via various components of comprehensive condition report 200.

One embodiment of detailed criteria data structure 400 provides a benefit of reduced network bandwidth usage. This benefit may be provided by detailed objective information of detailed criteria data structure 400 and allows finite communications network resources to be used to carry out other tasks. Additionally, detailed criteria data structure 400 may reduce the usage of computing resources of server 104 while still providing users with desired information about a desired item or item of interest. Moreover, increased user efficiency provided by detailed criteria data structure 400 results in reduced usage of stored electrical energy in a battery powering a display device in end-user console portals 110 on which data from detailed criteria data structure 400 is displayed. In another embodiment, detailed objective information provided by detailed criteria data structure 400 about an item of interest allows consumers to realize advantages of both the traditional goods or real estate purchasing approach and the virtual showroom approach.

Figure 4B:
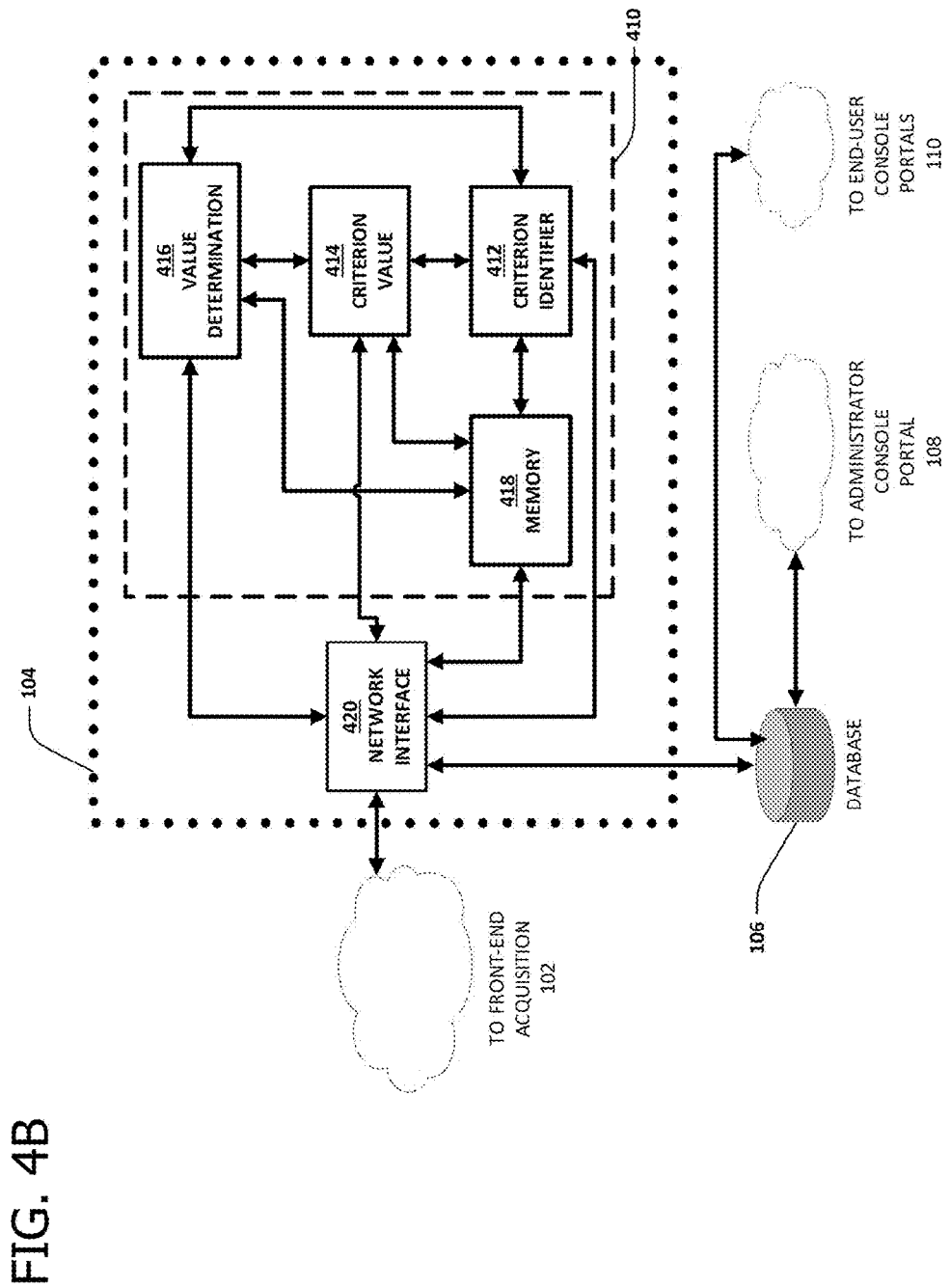
FIG. 4B illustrates a component for determining criterion values associated with criterion identifiers for an item of interest according to an embodiment of the invention.

FIG. 4B illustrates a detailed criteria component 410, which is adapted for determining values that are represented by data included in criterion identifier fields 402 and criterion value fields 404. In the embodiment illustrated by FIG. 4B, the detailed criteria component 410 is presented in tangible form as a computer-executable module on server 104. However, it is to be understood by one skilled in the art that detailed criteria component 410 may also be implemented as a digital or analog electronic circuit. Detailed criteria component 410 comprises sub-components, including a criterion identifier component 412, a criterion value component 414, a value determination component 416, and a memory 418. Also included in this embodiment is a network interface 420 of server 104.

The network interface 420 is communicatively connected to front-end information acquisition components 102 and database 106 via communications networks, such as the Internet. The network interface 420 is also communicatively connected to the memory 418, the criterion identifier component 412, the criterion value component 414, and the value determination component 416. In this manner, network interface 420 is also communicatively connected to detailed criteria component 410. These communicative connections between network interface 420 and other components included within server 104 may be accomplished via electrical interconnects. Memory 418 is also electrically connected to criterion identifier component 412, criterion value component 414, and value determination component 416. Further, criterion identifier component 412, criterion value component 414, and value determination component 416 are each electrically connected to one another.

The network interface 420 is adapted for facilitating data communication between front-end information acquisition components 102, database 106, and detailed criteria component 410 and its various sub-components. Memory 418 is adapted for storing data utilized and/or generated by criterion identifier component 412, criterion value component 414, and value determination component 416.

Criterion identifier component 412 is adapted for providing data representing a current criterion identifier, such as criterion identifier field 402-F that corresponds to a largest scratch length value of a scratch on a vehicle of interest. Value determination component 416 is adapted for determining a value corresponding to the current criterion identifier provided by criterion identifier component 412. In one embodiment, further explained below with respect to FIG. 4C, value determination component 416 utilizes data provided by criterion identifier component 412 and an image obtained from front-end information acquisition components 102 via network interface 420 to determine the value corresponding to the current criterion identifier provided by criterion identifier component 412.

Criterion value component 414 is adapted for providing data representing the determined current criterion value. In one embodiment, criterion value component 414 provides data representing the value in criterion value field 404-F that corresponds to a value of "6" for the largest scratch length value of a scratch on the vehicle of interest. The data provided by criterion value component 414 may be received from value determination component 416. The data provided by criterion value component 414 may also be received from front-end information acquisition components 102 via either network interface 420 or memory 418.

In an embodiment, detailed criteria component 410 provides advantages including increased user efficiency, reduced network bandwidth usage, and reduced computing resource utilization due to detailed information provided by detailed criteria component 410.

Figure 4C:
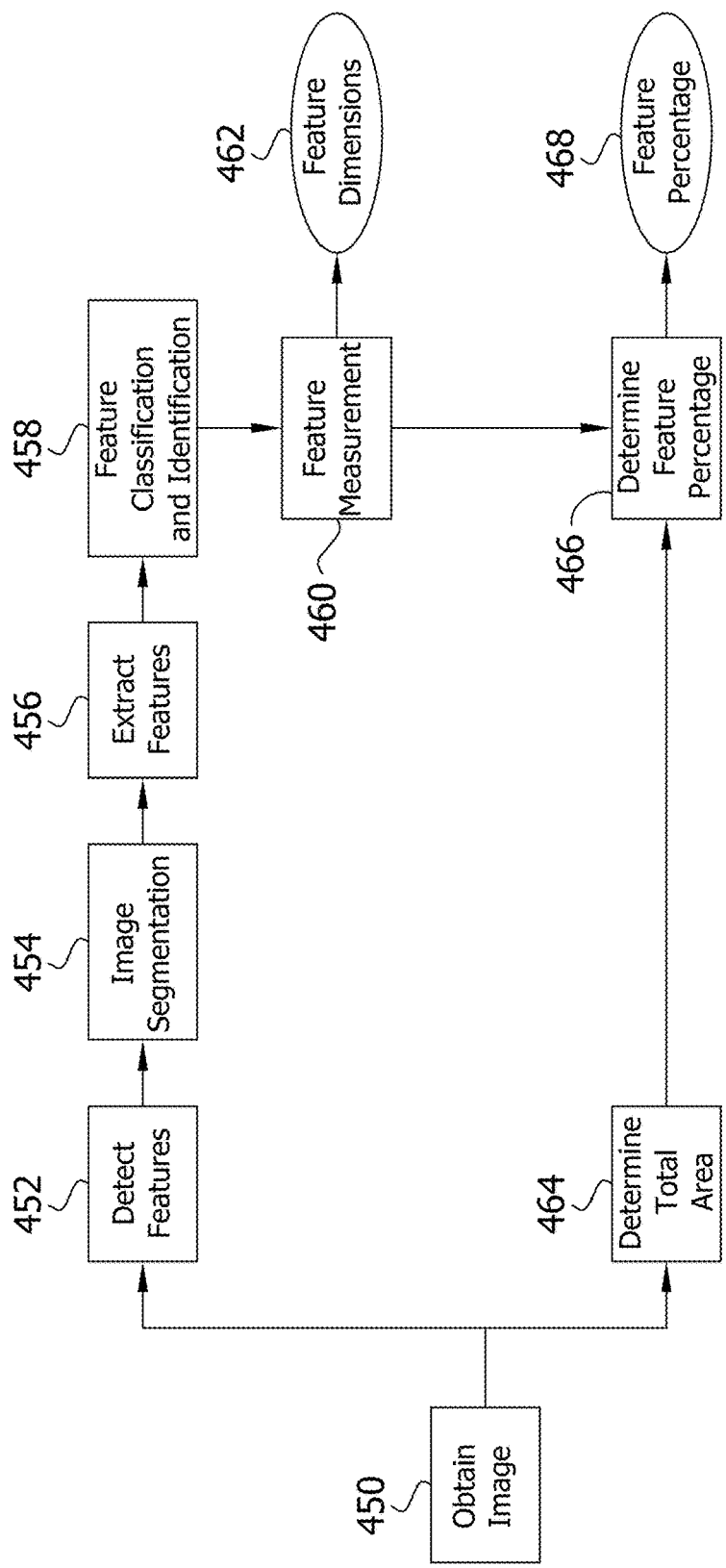
FIG. 4C is a flow chart illustrating a method of determining criterion values associated with criterion identifiers for an item of interest according to an embodiment of the invention.

Referring next to FIG. 4C, a flow chart illustrates a method of determining values that are represented by data included in criterion value fields 404. The method includes an image acquisition step 450, a feature detection step 452, an image segmentation step 454, a feature extraction step 456, a feature identification and classification step 458, a feature measurement step 460, a feature dimension output step 462, an area determination step 464, a feature percentage step 466, and a feature percentage output step 468. In one embodiment, the method steps are embodied in computer-executable instructions executing on server 104. In another embodiment, the method steps may also be implemented by digital or analog electronic circuitry.

In operation according to one embodiment, an image is obtained at image acquisition step 450 and stored in a computer-readable format. For example, an image is acquired with front-end information acquisition components 102 and transmitted to server 104. Upon completion of image acquisition step 450, feature detection step 452 is performed. In one embodiment, feature detection step 452 comprises examining each pixel of the acquired image to determine whether a feature is present at a given pixel. Exemplary image features include, but are not limited to, edges, corners (e.g., interest points), regions of interest (e.g., blobs), and ridges. Feature detection step 452 may utilize feature detection methods such as Canny, smallest univalue segment assimilating nucleus (SUSAN), and features from accelerated segment test (FAST) embodied as computer-executable instructions, for example.

In one embodiment, after feature detection step 452 is completed, image segmentation step 454 is performed. During image segmentation step 454, the obtained image is transformed by a partitioning into multiple sets of pixels in order to locate objects and boundaries (e.g., lines, curves) in the obtained image. It is to be understood by one skilled in the art that while image segmentation step 454 may be used to change the representation of the obtained imaged into a format that is more meaningful or easier to analyze, image segmentation step 454 may be omitted and the method may proceed from feature detection step 452 directly to feature extraction step 456.

Referring further to FIG. 4C, the feature extraction step 456 transforms the obtained image into a set of features, such that the set contains relevant information from the obtained image. For example, feature extraction step 456 may transform an obtained image of a vehicle of interest into a set of scratches on the vehicle. In an embodiment, feature extraction step 456 transforms the obtained image into a set of features with minimal resources of server 104 and memory 418. In one embodiment, feature extraction step 456 comprises general dimensionality reduction techniques, such as principal component analysis and latent semantic analysis, for example. In another embodiment, feature extraction step 456 utilizes a set of application-dependent features.

After feature extraction step 456, the method illustrated by FIG. 4C proceeds to the feature identification and classification step 458, in which one feature from the set of features is identified and classified as being of a certain type. In an embodiment, feature identification and classification step 458 selects one feature from the set of features produced by feature extraction step 456 and associates a unique identifier with that feature. The unique identifier given to the selected feature allows that feature to be tracked among more than one image and to be distinguished among other features. In another embodiment, feature identification and classification step 458 associates a selected feature with a type of features. For example, a feature that corresponds to a scratch on a vehicle of interest may be classified as type "scratch." The classification allows multiple features of the same type to be associated with each other for categorization. In one embodiment, feature identification and classification step 458 utilizes data provided by criterion identifier component 412 to provide the classification of the feature.

Still referring to the method illustrated by FIG. 4C, the dimensions of the identified feature are determined by feature measurement step 460. In an embodiment, feature measurement step 460 determines the dimensions of the identified feature in terms of pixels. In a further embodiment, feature measurement step 460 utilizes a predetermined value that is a function of the distance of the imaging device from the imaged object in order to determine the dimensions of the identified feature in real-world units (e.g., inches, centimeters, etc.). In yet another embodiment, feature measurement step 460 utilizes a known real-world dimension of an object in the same image as the identified feature in order to determine the dimensions of the identified feature in real-world units. The determined dimensions of the identified feature are feature dimensions 462. In an embodiment, feature dimensions 462 are provided to criterion value component 416.

The embodiment of FIG. 4C further determines the total area of a region of interest, which includes the identified feature, at area determination step 464. In an exemplary embodiment, area determination step 464 uses edges detected in feature detection step 452 to determine four edges that comprise the perimeter of a rectangular area of interest. The dimensions of the four edges are determined by feature measurement step 460. Then, using the dimensions, area determination step 464 uses the equation that the area of a rectangle is equal to the width of the rectangle multiplied by the length of the rectangle (i.e., $A=W \times L$) to calculate the area of the rectangular area of interest. It is to be understood by one skilled in the art that the total area of regions having other shapes may also be determined. For example, circular areas (i.e., $A=\pi r^2$) and irregularly shaped areas (e.g., using a definite integral) may also be determined. In one embodiment, area determination step 464 determines the area of the region of interest in the unit of pixels. In another embodiment, area determination step 464 utilizes a predetermined value that is a function of the distance of the imaging device from the imaged object in order to determine the dimensions of the identified feature in real-world units (e.g., inches, centimeters, etc.). In yet another embodiment, area determination step 464 utilizes a known real-world dimension of an object in the same image as the identified feature in order to determine the dimensions of the identified feature in real-world units.

The feature percentage step 466 then determines the ratio of the identified feature to the area of the region of interest. In an exemplary embodiment, feature percentage step 466 determines the area of an item of interest that is scratched and divides that value by the total area of the item of interest to calculate the ratio of the item of interest that is scratched. The determined ratio of the identified feature to the area of the region of interest is feature percentage 468. In an embodiment, feature percentage 468 is provided to criterion value component 416.

FIG. 5A illustrates a desired criteria data structure 500 for criteria and corresponding values that are associated with a desired item of interest according to an embodiment of the invention. The desired criteria data structure 500 has a first group of desired criterion identifier fields 502 comprising data that represents criterion identifiers by which the desired item of interest may be identified or evaluated. In one exemplary embodiment, desired criterion identifier fields 502 include data representing identifying criteria such as a make, model, color, and the like of a vehicle. Additionally, desired criterion identifier fields 502 may include data representing evaluating criteria such as a desired percentage level of damage to an item of interest and acceptable dimensions of damaged areas. Moreover, desired criterion identifier fields 502 may also include data representing evaluating criteria that are subjective, such as acceptable condition categories (e.g., mint, average, fine, poor) and desired opinions on the value of the item of interest (e.g., CONSUMERS DIGEST BEST BUY™).

Referring again to FIG. 5A, desired criteria data structure 500 also includes a second group of desired criterion value fields 504, each including data that represents values associated with a corresponding desired criterion identifier field 502. For example, desired criterion identifier field 502-G includes data representing a criterion of a maximum scratch width, in inches, acceptable to a user and corresponding desired criterion value field 504-G includes data representing a value of "0.25." Desired criterion value fields 504 may also contain data representing acceptable values expressed in other ways. For example, "less than" and "greater than" values, such as "less than 15" of desired criterion value field 504-H, the "any" of desired criterion value field 504-A indicating that a user does not have a preference for the corresponding criterion 502-A, and the range "0-5" of desired criterion value field 504-E.

In one embodiment, desired criteria data structure 500 functions as a wish list or favorites list of desired or acceptable criteria and corresponding values for a desired item of interest. In one embodiment, desired criteria data structure 500 is stored in database 106 on server 104. In a further embodiment, desired criterion identifier fields 502 and desired criterion value fields 504 include data that are presented to a user via various components of comprehensive condition report 200.

One embodiment of desired criteria data structure 500 provides a benefit of reduced network bandwidth usage. This benefit may be provided by desired criterion values provided by desired criteria data structure 500 and allows finite communications network resources to be used to carry out other tasks. Further, desired criteria data structure 500 may reduce the usage of computing resources on server 104 while still providing users with the ability to locate a desired item or item of interest. Additionally, increased user efficiency provided by desired criteria data structure 500 results in reduced usage of stored electrical energy in a battery powering a display device in end-user console portals 110. In another embodiment, desired criteria data structure 500 allows consumers to realize advantages of both the traditional goods or real estate purchasing approach and the virtual showroom approach.

Figure 5B:
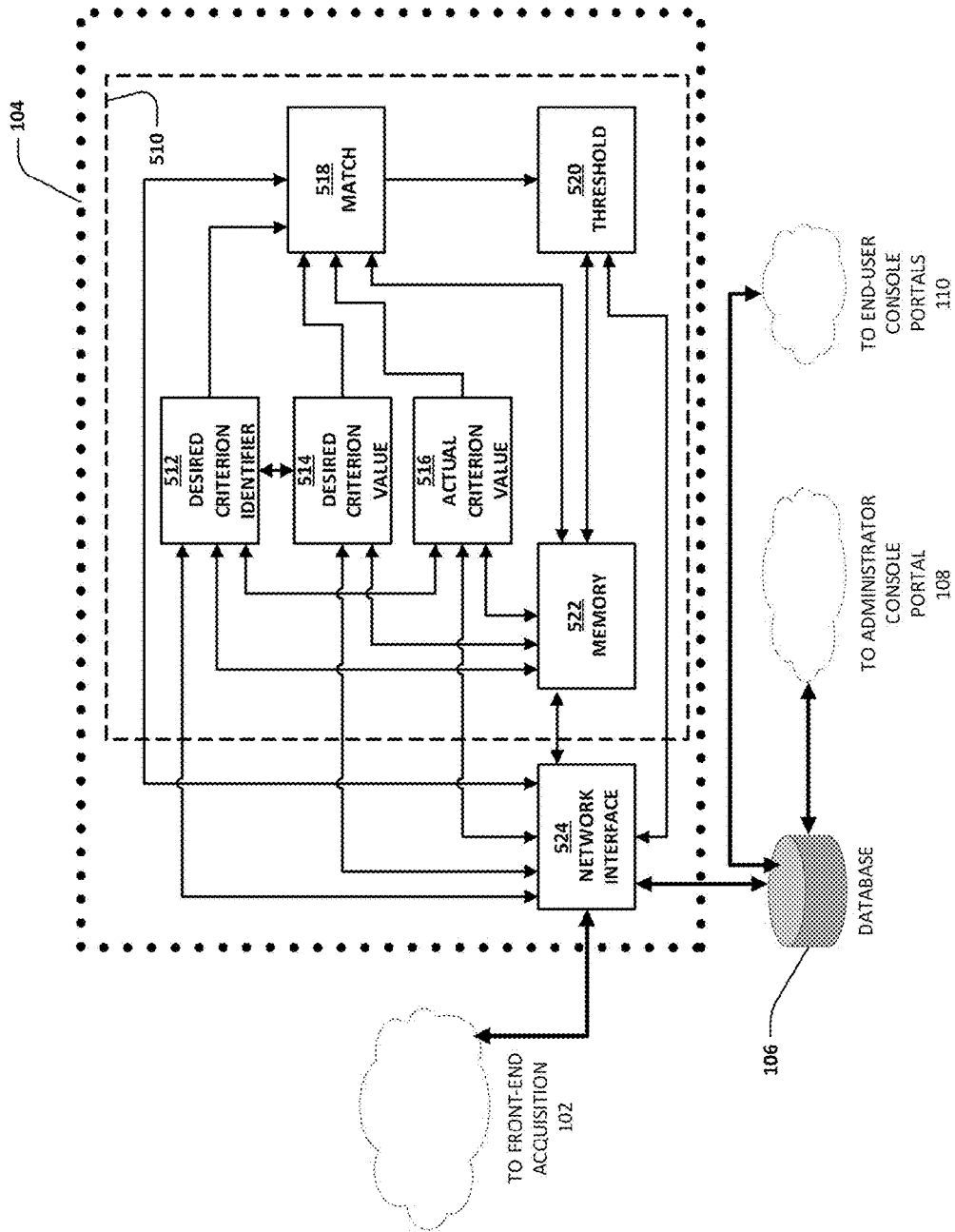
FIG. 5B illustrates a component for determining when a criterion value for a desired item satisfies a criterion value of an item of interest according to an embodiment of the invention.

FIG. 5B illustrates a desired criteria component 510 that, in one embodiment, is adapted for determining when an actual criterion value matches a desired criterion value. In a further embodiment, desired criteria component 510 is adapted for determining when an amount of matched criterion values satisfies an acceptable threshold level. The desired criteria component 510 includes a desired criterion identifier component 512, a desired criterion value component 514, an actual criterion value component 516, a match component 518, a threshold component 520, and a memory 522. In the embodiment of FIG. 5B, desired criteria component 510 is included within server 104, in addition to a network interface 524.

The network interface 524 is communicatively connected to front-end information acquisition components 102 and database 106 via communications networks, such as the Internet. Network interface 524 is also communicatively connected to the desired criterion identifier component 512, the desired criterion value component 514, the actual criterion value component 516, the match component 518, the threshold component 520, and the memory 522. By virtue of network interface 524 being communicatively connected to the sub-components of desired criteria component 510, one skilled in the art will understand that network interface 524 can be said to also be communicatively connected to desired criteria component 510. Memory 522 is electrically connected to desired criterion identifier component 512, desired criterion value component 514, actual criterion value component 516, match component 518, and threshold component 520. Desired criterion identifier component 512 is electrically connected to desired criterion value component 514, actual criterion value component 516, and match component 518. Desired criterion value component 514 and actual criterion value component 516 are each electrically connected to match component 518. Moreover, threshold component 520 is electrically connected to match component 518.

Referring further to FIG. 5B, the network interface 524 is adapted for facilitating data communication between front-end information acquisition components 102, database 106, and desired criteria component 510 and its sub-components. Memory 522 is adapted for storing data utilized and/or generated by desired criterion identifier component 512, desired criterion value component 514, actual criterion value component 516, match component 518, and threshold component 520. In an embodiment, memory 522 is a memory component on server 104 that may be utilized by additional components of server 104. In another embodiment, memory 522 is a memory component utilized solely by desired criteria component 510.

Desired criterion identifier component 512 is adapted for providing data representing a current desired criterion identifier, such as desired criterion identifier field 502-H corresponding to a maximum desired percentage of hail damage to a desired vehicle. In one embodiment, desired criterion identifier component 512 receives the current desired criterion identifier from database 106 via network interface 524. In a further embodiment, desired criterion identifier component 512 receives the current desired criterion identifier from memory 522.

Desired criterion value component 514 of FIG. 5B is adapted for providing data representing a desired criterion value corresponding to the current desired criterion identifier provided by desired criterion identifier component 512. In an embodiment, desired criterion value component 514 provides data representing desired criterion value field 504-H, which corresponds to a value of the maximum desired percentage of hail damage to the desired vehicle.

Actual criterion value component 516 is adapted for providing data representing an actual criterion value corresponding to the current desired criterion identifier provided by desired criterion identifier component 512. In one embodiment, actual criterion value component 516 provides data representing criterion value field 404-H, which corresponds to a value of the percentage of hail damage to a vehicle of interest.

Still referring to FIG. 5B, match component 518 is adapted for determining when the actual criterion value provided by actual criterion value component 516 satisfies the desired criterion value provided by desired criterion value component 514. In an embodiment, the data provided by desired criterion identifier component 512, desired criterion value component 514, and actual criterion value component 516 are received by match component 518. Match component 518 then compares the actual criterion value and the desired criterion value, as further described below with respect to FIG. 5C. In an embodiment in which the actual criterion value satisfies the desired criterion value, match component 518 provides the desired criterion identifier and a match indicator to memory 522, threshold component 520, and/or network interface 524. In an embodiment in which the actual criterion value fails to satisfy the desired criterion value, match component 518 provides the desired criterion identifier and a no-match indicator to memory 522, threshold component 520, and/or network interface 524.

Threshold component 520 is adapted for determining when a number of match indicators provided by match component 518 and/or memory 522 satisfies a threshold value provided by memory 522 and/or network interface 524. In one embodiment, data provided by match component 518 is received by threshold component 520. In a further embodiment, data stored in memory 522 is retrieved by threshold component 520. Threshold component 520 compares a percent of match indicators to a threshold value, as further described below with respect to FIG. 5D.

In one embodiment, a threshold value is provided by an end-user console portal 110 and stored in database 106 or memory 522. The threshold value indicates an amount of deviation from a desired item that will be considered acceptable. For example, desired criteria data structure 500 may represent criterion values of a desired vehicle, such that satisfaction of every criterion value by a vehicle of interest would be deemed a complete match. However, a deviation from a complete match, such as a vehicle of interest that satisfies ninety percent of the criterion values, may be acceptable for a particular need. In this instance, the vehicle of interest will be deemed a matching vehicle although it is not a complete match.

In an embodiment in which the percent of match indicators satisfies the threshold value, threshold component 520 provides a match indication. For example, the match indication may be provided by threshold component 520 to memory 522, database 106 via network interface 524, and/or end-user console portals 110 via network interface 524. In an embodiment in which the percent of match indicators does not satisfy the threshold value, threshold component 520 does not provide a match indication.

In an embodiment, desired criteria component 510 provides advantages including increased user efficiency, reduced network bandwidth usage, and reduced computing resource utilization due to data provided by match component 518 and/or threshold component 520.

Figure 5C:
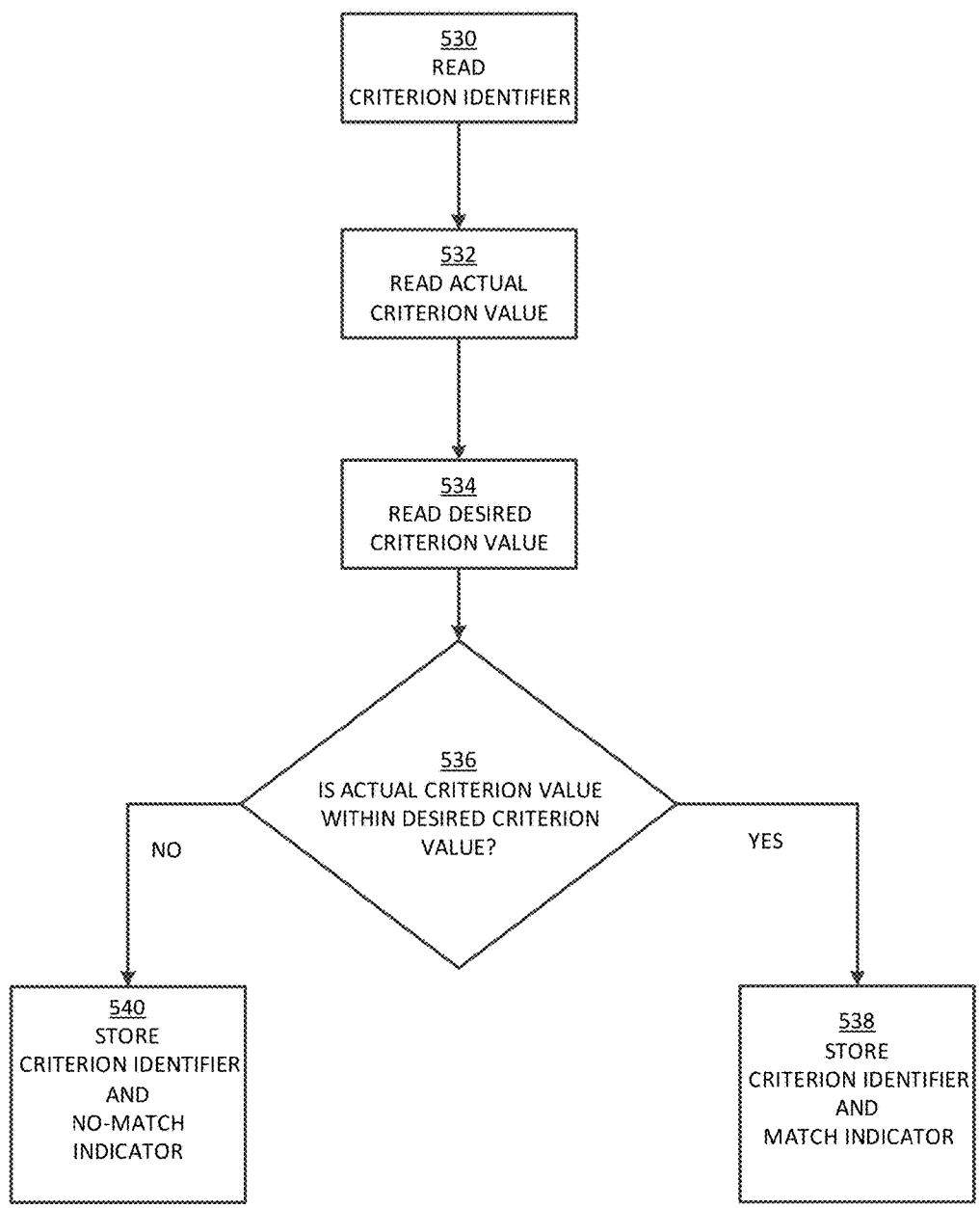
FIG. 5C is a flow chart illustrating a method of determining when a criterion value for a desired item satisfies a criterion value of an item of interest according to an embodiment of the invention.

Referring next to FIG. 5C, a flow chart illustrates a method of determining a match between a desired criterion value and an actual criterion value. In one embodiment, the illustrated method is embodied in computer-executable instructions stored on server 104 and executed by match component 518. The method includes a read criterion identifier step 530, a read actual criterion value step 532, a read desired criterion value step 534, a determination step 536, a store match indicator step 538, and a store no-match indicator step 540.

During the read criterion identifier step 530, data representing a desired criterion identifier is accessed or received. In an exemplary embodiment, match component 518 receives the data representing the desired criterion identifier provided by desired criterion identifier component 512. At the read actual criterion value step 532, data representing an actual criterion value is accessed or received. For example, match component 518 receives the data representing the actual criterion value provided by actual criterion value component 516. The read desired criterion value step 534 results in data representing a desired criterion value being accessed or received. In an embodiment, match component 518 receives the data representing the desired criterion value provided by desired criterion value component 514.

At determination step 536 of FIG. 5C, it is ascertained whether the actual criterion value satisfies the desired criterion value. For example, match component 518 may compare an actual value of "10" (e.g., the percentage of hail damage to a vehicle of interest in criterion value field 404-H) to a desired value of "less than 15" (e.g., the maximum desired percentage of hail damage to a desired vehicle in desired criterion value field 504-H). In this example, the actual value "10" satisfies the desired value of "less than 15," and thus the vehicle of interest matches the desired vehicle with respect to the maximum percentage of hail damage criterion identifier. Such a satisfaction of the desired criterion value results in the method proceeding to step 538, in which the criterion identifier and a match indicator are stored in memory 522 and/or database 106. The match indicator specifies that the desired criterion value has been satisfied by the actual criterion value for the corresponding criterion identifier.

In the event determination step 536 ascertains that the actual criterion value does not satisfy the desired criterion value, the method proceeds to step 540. At step 540, the criterion identifier and a no-match indicator are stored in memory 522 and/or database 106. The no-match indicator specifies that the actual criterion value has failed to satisfy the desired criterion value for the corresponding criterion identifier.

Figure 5D:
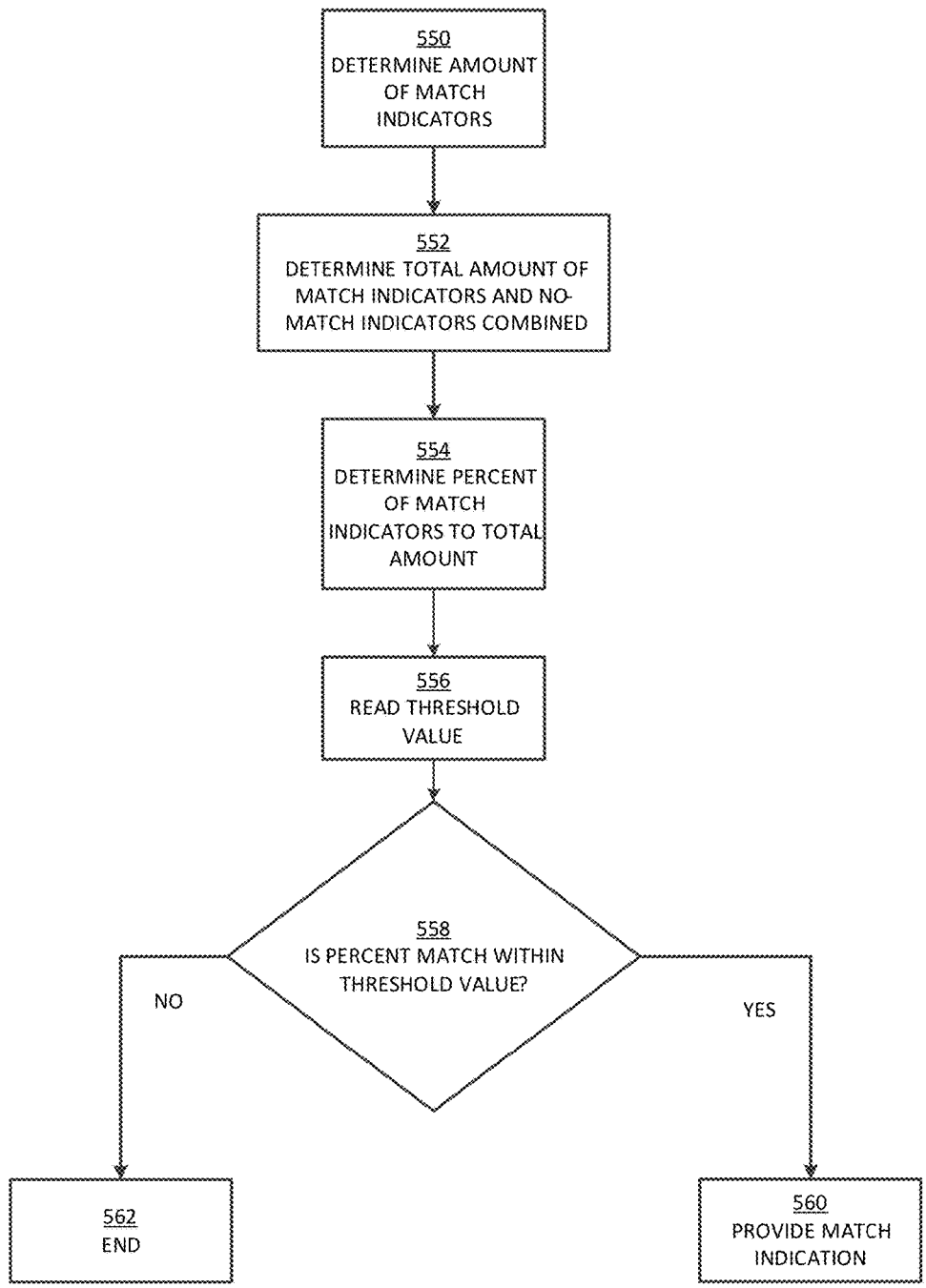
FIG. 5D is a flow chart illustrating a method of determining when an amount of matched criterion values satisfies a threshold value according to an embodiment of the invention.

Referring to FIG. 5D, a flow chart illustrates a method of determining when an item of interest falls with a desired match threshold value. As explained above with respect to FIG. 5B, the threshold value indicates an amount of deviation from a desired item that will be considered acceptable. In one embodiment, the method of FIG. 5D is embodied in computer-executable instructions stored on server 104 and executed by threshold component 520. The method includes a match indicator amount step 550, a total combined amount step 552, a percent determination step 554, a threshold value step 556, a satisfaction determination step 558, a match indication step 560, and an end process step 562.

At the match indicator amount step 550, a determination is made of an amount of the number of match indicators for a particular item of interest. In one embodiment, threshold component 520 accesses match indicators stored in memory 522 and determines a total number of match indicators associated with an item of interest.

During the total combined amount step 552 of FIG. 5D, a determination is made of a total combined number of match indicators and no-match indicators associated with the item of interest. For example, threshold component 520 may access the match indicators and no-match indicators stored in memory 522 and then add the amount of each together.

At percent determination step 554, a determination is made of the ratio of match indicators to the total combined number of match indicators and no-match indicators. In an embodiment, the ratio indicates an amount that an item of interest deviates from a desired item. During threshold value step 556, a threshold value is accessed by threshold component 520. In one embodiment, threshold component 520 accesses the threshold value from memory 522. Threshold component 520 may also access the threshold value from database 106 or receive the threshold value end-user console portals 110 via network interface 524.

Still referring to FIG. 5D, a satisfaction determination step 558 ascertains whether the percentage determined at percent determination step 554 satisfies the threshold value from threshold value step 556. For example, a percentage of 95 percent may be determined during percent determination step 554 and a threshold value of 90 percent may be accessed at threshold value step 556. Thus, the item of interest deviates from a desired item by 5 percent (e.g., the difference between 100 and 95) and the amount of deviation from the desired item that is acceptable is 10 percent (e.g., the difference between 100 and 90). In this example, the percentage of 95 percent satisfies the threshold value of 90 percent. Such a satisfaction of the threshold value results in the method proceeding to step 560, in which a match indication is provided. In an embodiment, a match indication is provided as alert 802 on a GUI of a device of end-user console portals 110. A match indication may also be an e-mail, a text message, or the like. In another embodiment, the match indication is provided to database 106 via network interface 524. In the event satisfaction determination step 558 ascertains that the percentage does not satisfy the threshold value, the method proceeds to step 562 where the process ends.

FIG. 6 illustrates an inventory data structure 600 for a plurality of items of interest according to an embodiment of the invention. The inventory data structure 600 includes inventory records 602-A, 602-B, and 602-N, each of which correspond to a particular item of interest and contain associated identification fields 604, condition report fields 606, detailed criteria information fields 608, and additional fields 610. In an exemplary embodiment, the inventory record 602-A corresponds to a first vehicle of interest, the inventory record 602-B corresponds to a second vehicle of interest, and the inventory record 602-N corresponds to a third vehicle of interest. In this manner, inventory record 602-A, inventory record 602-B, and inventory record 602-N comprise an inventory of vehicles available for display via a virtual showroom. Moreover, inventory record 602-A may comprise an inventory of a first seller, inventory record 602-B may comprise an inventory of a second seller, and inventory record 602-N may comprise an inventory of a third seller. In this manner, inventory data structure 600 is adapted for providing a common inventory containing items from multiple sellers. In one embodiment, inventory data structure 600 is stored in database 106 on server 104. In a further embodiment, inventory records 602 include data that is presented via various components of comprehensive condition report 200 and/or virtual showroom 700 (FIG. 7).

Referring further to FIG. 6, the identification fields 604 are adapted for identifying inventory records 602 among each other. In an exemplary embodiment, identification field 604-A contains data representing a value of "1" and identification field 604-B contains data representing a value of "2" such that inventory record 602-A and inventory record 602-B are identified separately from each other. In a further embodiment, each identification field 604 contains data representing a VIN number of a vehicle to which each inventory record 602 corresponds.

The condition report fields 606 are adapted for storing data that comprise comprehensive condition report 200. The detailed criteria information fields 608 are adapted for storing data that comprise detailed criteria data structure 400. The additional fields 610 are adapted for storing further data corresponding to inventory records 602. In one embodiment, additional field 610-A stores data that comprises desired criteria data structure 500. In another embodiment, additional field 610-A stores data identifying a seller or dealer who is holding the item of interest corresponding to inventory record 602-A open for an exchange.

FIG. 7 illustrates a graphical user interface virtual showroom, generally indicated at 700, for displaying an inventory of items in accordance with an embodiment of the invention. The virtual showroom 700 is comprised of a website template and includes user controls 702, inventory area 704, and inventory items 706-A, 706-B, and 706-C. In an embodiment, the virtual showroom 700 is used with a website template stored on server 104 or an external server for managing or showcasing the item inventory.

The virtual showroom 700 is comprised of the templates, images, and corresponding information and is accessible via the Internet. Advantageously, the website template permits a developer to easily build a website from the hosted content to showcase goods or real estate. Through use of the template, aspects of the invention integrate with database 105 to dynamically populate customer and item data for showcasing item data that has been processed by server 104. For example, virtual showroom 700 may showcase item data contained in inventory data structure 600. In an embodiment, the populated template consists of a homepage, a showroom page containing an entry (e.g., inventory items 706) for each item, and a detailed item page for each item (e.g., comprehensive condition report 200). It is contemplated that virtual showroom 700 may be accessed via the end-user console portals 110 from any computing device, including but not limited to personal computers, mobile devices, and tablet computing devices.

In an embodiment, the user controls 702-A, 702-B, and 702-C are adapted for capturing criterion values of various criterion identifiers for a desired item. For example, the captured criterion values may be stored in desired criterion value fields 504 of desired criteria data structure 500. In another embodiment, user controls 702-A, 702-B, and 702-C are adapted for capturing values that specify which items corresponding to select inventory records 602 of inventory data structure 600 will be displayed in inventory area 704. User controls 702 may be checkboxes, sliders, text inputs, or the like on a graphical user interface of a device of end-user console portals 110.

In the embodiment of FIG. 7, the inventory area 704 is adapted for displaying the inventory items 706. For example, inventory item 706-A may correspond to inventory record 602-A of inventory data structure 600. In another embodiment, inventory area 704 may be adapted for displaying comprehensive condition report 200 or a portion thereof. For instance, inventory item 706-A may display a portion of condition report field 606-A of inventory data structure 600, which stores data that comprise comprehensive condition report 200 for an item corresponding to inventory record 602-A.

Figure 8:
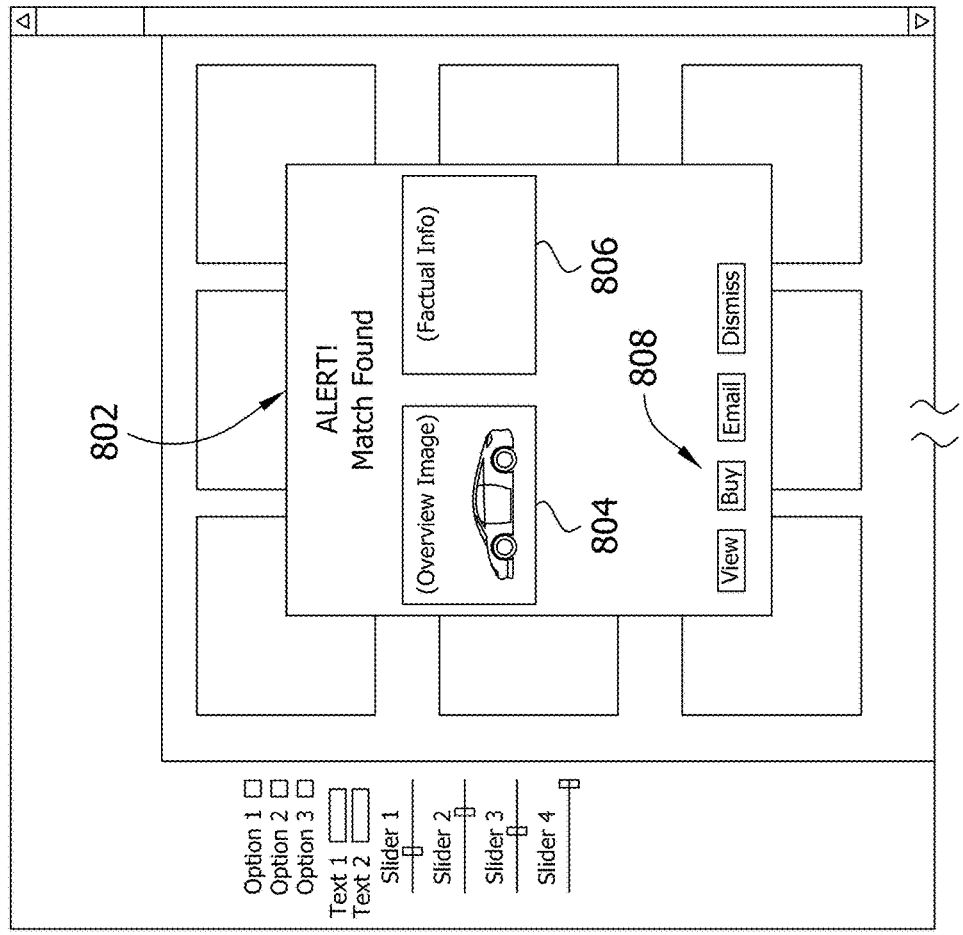
FIG. 8 illustrates an exemplary user interface alert in accordance with an embodiment of the invention.

FIG. 8 illustrates an exemplary graphical user interface pop-up notification alert 802. In the illustrated embodiment, the alert 802 includes a match overview component 804, a match factual information component 806, and user controls 808. Alert 802 is adapted for notifying a user that an item of interest satisfies the threshold value for a desired item. In the illustrated embodiment, alert 802 is a pop-up notification on a GUI. Exemplary pop-up notifications include toastings, passive pop-ups, desktop notifications, notification bubbles, rustings, balloon notifications, and the like. It is also contemplated that alert 802 may be a text message, email, auditory alert, vibrating device alert, and the like.

The match overview component 804 is adapted for providing a visual summary of the item of interest. In the embodiment illustrated by FIG. 8, match overview component 804 is an image of a vehicle that is the item of interest. Match overview component 804 allows a user to visually recognize the item of interest. In additional embodiments, match overview component 804 may comprise other content formats that provide a visual summary of the item of interest, such as text and video. In another embodiment, match overview component 804 may correspond to item overview component 204 of comprehensive condition report 200.

The match factual information component 806 is adapted for providing objective information about the item of interest. For example, match factual information component 806 may provide a VIN, a make, a model, and an engine type of a vehicle of interest in a text format. Additional objective and factual information may also be provided by match factual information component 806, such as a percentage of a vehicle of interest that contains scratches or damage, scratch dimensions, hail damage information, stain information, and the like. Further, match factual information component 806 may provide objective information in additional content formats, such as images and videos. In another embodiment, match factual information component 806 may correspond to factual information component 208 of comprehensive condition report 200.

The user controls 808 are adapted for receiving commands corresponding to alert 802. For example, a user control 808 may include a "view" button that, when pressed, provides for the display of comprehensive condition report 200 corresponding to the item of interest. In another embodiment, a user control 808 may include a button that is adapted for providing the ability to engage in a transaction involving the item of interest. Exemplary transactions include purchases, sales, and in-kind exchanges of the item of interest. Further, a user control 808 may dismiss alert 802.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for rendering a virtual showroom, comprising:
    a front-end information acquisition device configured to acquire one or more images of each of a plurality of items of interest available from a plurality of providers;
    a database configured to store a plurality of inventory records and a desired criteria data structure, wherein the desired criteria data structure comprises data representing objective information about a desired item, wherein each inventory record corresponds to one of the items of interest, and wherein each inventory record comprises:
        data representing the acquired images of the corresponding item of interest;
        a detailed criteria data structure comprising data representing objective information about the corresponding item of interest; and
        data representing a comprehensive condition report about the corresponding item of interest; and
    a computer configured to execute computer-executable instructions, wherein the computer-executable instructions, when executed by the computer, configure the computer to:
        render a virtual showroom user interface comprising the acquired images of one or more of the plurality of items of interest and the data comprising the detailed criteria data structures corresponding thereto;
        compare the data comprising the detailed criteria data structure of each inventory record and the data comprising the desired criteria data structure;
        render an alert when the data comprising the detailed criteria data structure of an inventory record of the plurality of inventory records satisfies the data comprising the desired criteria data structure, wherein the alert includes a user control element and the data representing the objective information about the item of interest corresponding to the inventory record; and
        render, in response to a selection of the user control element of the alert, the comprehensive condition report comprising the inventory record.

2. The system of claim 1, wherein the computer-executable instructions comprise instructions that, when executed by the computer, configure the computer to automatically stitch at least two of the acquired images together.

3. The system of claim 1, further comprising a printing device configured to print the acquired images corresponding to at least one of the items of interest and the data representing objective information about the item of interest on a vinyl addendum.

4. A computer implemented method for rendering a virtual showroom, comprising:
    acquiring one or more images of each of a plurality of items of interest available from a plurality of providers;
    storing a plurality of inventory records, each inventory record corresponding to one of the items of interest, and each inventory record comprising:
        data representing the acquired images of the corresponding item of interest;
        a detailed criteria data structure comprising data representing objective information about the corresponding item of interest; and
        data representing a comprehensive condition report about the corresponding item of interest;
    storing a desired criteria data structure comprising data representing objective information about a desired item;
    rendering a virtual showroom user interface presenting the acquired images of one or more of the plurality of items of interest and the data comprising the detailed criteria data structures corresponding thereto;
    comparing the data comprising the detailed criteria data structure of each inventory record and the data comprising the desired criteria data structure;
    rendering an alert when the data comprising the detailed criteria data structure of an inventory record of the plurality of inventory records satisfies the data comprising the desired criteria data structure, said alert including a user control element and the data representing the objective information about the item of interest corresponding to the inventory record; and
    rendering, in response to a selection of the user control element of the alert, the comprehensive condition report comprising the inventory record.

5. The method of claim 4, further comprising automatically stitching at least two of the acquired images together.

6. The method of claim 4, further comprising printing the acquired images and the data representing objective information about the item of interest on a vinyl addendum.

7. A computer readable storage device having processor readable instructions stored thereon including instructions that, when executed by a processor, implement a method of rendering a virtual showroom, comprising:
    acquiring one or more images of each of a plurality of items of interest available from a plurality of providers;
    storing a plurality of inventory records, each inventory record corresponding to one of the items of interest, and each inventory record comprising:
        data representing the acquired images;
        a detailed criteria data structure comprising data representing objective information about the corresponding item of interest; and
        data representing a comprehensive condition report about the corresponding item of interest;
    storing a desired criteria data structure comprising data representing objective information about a desired item;
    rendering a virtual showroom user interface presenting the acquired images of one or more of the plurality of items of interest and the data comprising the detailed criteria data structures corresponding thereto;
    comparing the data comprising the detailed criteria data structure of each inventory record and the data comprising the desired criteria data structure;

rendering an alert when the data comprising the detailed criteria data structure of an inventory record of the plurality of inventory records satisfies the data comprising the desired criteria data structure, said alert including a user control element and the data representing the objective information about the item of interest corresponding to the inventory record; and rendering, in response to a selection of the user control element of the alert, the comprehensive condition report comprising the inventory record.

8. The computer readable storage device of claim 7, further comprising automatically stitching at least two of the acquired images together.

9. The method of claim 7, further comprising printing the acquired images and the data representing objective information about the item of interest on a vinyl addendum.

10. The system of claim 1, wherein the alert comprises at least one element selected from the group consisting of a pop-up notification, a text message, an email, an auditory alert, a vibrating device alert, and combinations thereof.

11. The system of claim 1, wherein the comprehensive condition report comprises at least one element selected from the group consisting of:
    a physical location of the item of interest corresponding to the inventory record at a current time and at times in the past,
    somatic sensation information of the item of interest corresponding to the inventory record,
    one or more images of an undercarriage of the item of interest corresponding to the inventory record,
    a combination of an exterior interactive panoramic image and an interior interactive panoramic image of the item of interest corresponding to the inventory record, and combinations thereof.

12. The system of claim 1, wherein the comprehensive condition report includes at least one of:
    an identifier of the item of interest corresponding to the inventory record,
    a visual summary of the item of interest corresponding to the inventory record,
    alternate images of the item of interest corresponding to the inventory record,
    the objective information about the item of interest corresponding to the inventory record,
    subjective information about the item of interest corresponding to the inventory record,
    an exchange component configured to engage a transaction of the item of interest corresponding to the inventory record,
    an exterior panoramic image of the item of interest corresponding to the inventory record,
    an interior panoramic image of the item of interest corresponding to the inventory record,
    audio content about the item of interest corresponding to the inventory record,
    a video presentation of the item of interest corresponding to the inventory record,
    historical information of the item of interest corresponding to the inventory record,
    an expected future physical location of the item of interest corresponding to the inventory record, and
    damage information about one or more damages to the item of interest corresponding to the inventory record.

13. The system of claim 1, wherein each of the detailed criteria data structures includes a plurality of detailed criteria, wherein the desired criteria data structure includes a plurality of desired criteria, and wherein the computer-executable instructions that configure the computer to compare the data comprising the detailed criteria data structure of each inventory record and the data comprising the desired criteria data structure further comprise instructions that, when executed by the computer, configure the computer to:
    store a match indicator in memory for the inventory record when a detailed criterion of the detailed criteria data structure thereof matches a corresponding desired criterion of the desired criteria data structure,
    store a no-match indicator in memory for the inventory record when the detailed criterion of the detailed criteria data structure thereof does not match the corresponding desired criterion of the desired criteria data structure,
    ascertain an amount of match indicators of each inventory record,
    ascertain a total amount of match indicators and no-match indicators of each inventory record,
    ascertain a ratio of the amount of match indicators to the total amount of match indicators and no-match indicators of each inventory record, and
    render a match indication when the ratio satisfies a threshold value representing an acceptable deviation from the plurality of desired criteria of the desired criteria data structure.

14. The system of claim 3, wherein the printing device is configured to print a quick response (QR) code on the vinyl addendum, wherein the QR code is unique to the item of interest, and wherein the QR code is configured to be scanned by a mobile computing device to access the comprehensive condition report comprising the inventory record of the item of interest.

15. The method of claim 4, wherein the alert comprises at least one element selected from the group consisting of a pop-up notification, a text message, an email, an auditory alert, a vibrating device alert, and combinations thereof.

16. The method of claim 4, wherein the comprehensive condition report comprises at least one element selected from the group consisting of:
    a physical location of the item of interest corresponding to the inventory record at a current time and at times in the past,
    somatic sensation information of the item of interest corresponding to the inventory record,
    one or more images of an undercarriage of the item of interest corresponding to the inventory record,
    a combination of an exterior interactive panoramic image and an interior interactive panoramic image of the item of interest corresponding to the inventory record, and combinations thereof; and
wherein the comprehensive condition report further comprises at least one of:
    an identifier of the item of interest corresponding to the inventory record,
    a visual summary of the item of interest corresponding to the inventory record,
    alternate images of the item of interest corresponding to the inventory record,
    the objective information about the item of interest corresponding to the inventory record,
    subjective information about the item of interest corresponding to the inventory record,
    an exchange component configured to engage a transaction of the item of interest corresponding to the inventory record,
    an exterior panoramic image of the item of interest corresponding to the inventory record, an interior panoramic image of the item of interest corresponding to the inventory record,
audio content about the item of interest corresponding to the inventory record,
a video presentation of the item of interest corresponding to the inventory record,
historical information of the item of interest corresponding to the inventory record,
an expected future physical location of the item of interest corresponding to the inventory record, and
damage information about one or more damages to the item of interest corresponding to the inventory record.

17. The method of claim 6, further comprising printing a quick response (QR) code on the vinyl addendum, wherein the QR code is unique to the item of interest, and wherein the QR code is configured to be scanned by a mobile computing device to access the comprehensive condition report comprising the inventory record of the item of interest.

18. The computer readable storage device of claim 7, wherein the alert comprises at least one element selected from the group consisting of a pop-up notification, a text message, an email, an auditory alert, a vibrating device alert, and combinations thereof.

19. The computer readable storage device of claim 7, wherein the comprehensive condition report comprises at least one element selected from the group consisting of:
a physical location of the item of interest corresponding to the inventory record at a current time and at times in the past,
somatic sensation information of the item of interest corresponding to the inventory record,
one or more images of an undercarriage of the item of interest corresponding to the inventory record,
a combination of an exterior interactive panoramic image and an interior interactive panoramic image of the item of interest corresponding to the inventory record, and combinations thereof; and wherein the comprehensive condition report further comprises at least one of:
an identifier of the item of interest corresponding to the inventory record,
a visual summary of the item of interest corresponding to the inventory record,
alternate images of the item of interest corresponding to the inventory record,
the objective information about the item of interest corresponding to the inventory record,
subjective information about the item of interest corresponding to the inventory record,
an exchange component configured to engage a transaction of the item of interest corresponding to the inventory record,
an exterior panoramic image of the item of interest corresponding to the inventory record,
an interior panoramic image of the item of interest corresponding to the inventory record,
audio content about the item of interest corresponding to the inventory record,
a video presentation of the item of interest corresponding to the inventory record,
historical information of the item of interest corresponding to the inventory record,
an expected future physical location of the item of interest corresponding to the inventory record, and
damage information about one or more damages to the item of interest corresponding to the inventory record.

20. The computer readable storage device of claim 9, further comprising printing a quick response (QR) code on the vinyl addendum, wherein the QR code is unique to the item of interest, and wherein the QR code is configured to be scanned by a mobile computing device to access the comprehensive condition report comprising the inventory record of the item of interest.

* * * * *